(12) United States Patent
Charczuk et al.

(10) Patent No.: US 7,993,573 B2
(45) Date of Patent: Aug. 9, 2011

(54) SLAG TRANSPORT AND DUMPING APPARATUS AND METHOD

(75) Inventors: Bogdan Z. Charczuk, Winona (CA); John L. Evans, Burlington (CA)

(73) Assignee: Paling Transporter Ltd., Hamilton (CA)

( * ) Notice: Subject to any disclaimer, the term of this patent is extended or adjusted under 35 U.S.C. 154(b) by 350 days.

(21) Appl. No.: 12/278,096

(22) PCT Filed: Feb. 1, 2007

(86) PCT No.: PCT/CA2007/000162
§ 371 (c)(1),
(2), (4) Date: Aug. 1, 2008

(87) PCT Pub. No.: WO2007/087726
PCT Pub. Date: Aug. 9, 2007

(65) Prior Publication Data
US 2009/0026667 A1     Jan. 29, 2009

Related U.S. Application Data

(60) Provisional application No. 60/763,906, filed on Feb. 1, 2006.

(51) Int. Cl.
*C21B 3/10*     (2006.01)
(52) U.S. Cl. .............................. 266/232; 266/276; 266/44
(58) Field of Classification Search ............. 266/276, 266/232, 44
See application file for complete search history.

(56) References Cited

U.S. PATENT DOCUMENTS
2009/0026667 A1 *   1/2009   Charczuk et al. ............... 266/44

FOREIGN PATENT DOCUMENTS
JP     02002090074 A   *   3/2002
WO    WO 95/08649      *   3/1995
WO    WO 95/08649 A1       3/1995

OTHER PUBLICATIONS 25-55 Ton Lift Trucks, Paling Transporter Ltd., 409 Nash Road North, Hamilton, Ontario, Canada L8H 7R8, pp. 1 to 4.
Kress Slag Pot Carriers, Kress Corporation, 227 Illinois Street, Brimfield, Illinois, U.S.A. 61517, SPC 993, pp. 1 to 8.
Moving Steel Around The World, Paling Transporter Ltd., 409 Nash Road North, Hamilton, Ontario, Canada L8H 7R8, p. 1.
Paling Continuous Transport System CTS-200 Transporter, Paling Heavy Transporter Divn., 560 Parkdale Ave. N., Hamilton, Ontario, Canada L8H 5Y8, pp. 1 to 6.

* cited by examiner

*Primary Examiner* — Scott Kastler
(74) *Attorney, Agent, or Firm* — Fasken Martineau DuMoulin LLP; Kevin E. Holbeche

(57) ABSTRACT

A slag transport and dumping apparatus, for use with slag, includes a vehicle, a pallet, and a lifting mechanism. The vehicle includes a bed having a pallet interface. The pallet includes a support frame having ground support members, and a transporter interface selectively engaging the pallet interface. A dump container has a slag reservoir. Rear pivots on the container and pallet, together with the lifting mechanism, which is securely mounted to the bed of the vehicle and selectively engages the container, enable secure selective pivoting of the container between slag retaining and pouring configurations. In a loading configuration, the reservoir receives the slag, the container is in the retaining configuration, and the vehicle is removed from the pallet. In a transporting configuration, the container is in the retaining configuration, and the vehicle securely engages the pallet, in carrying relation, thus enabling transport of the pallet.

47 Claims, 12 Drawing Sheets

SLAG TRANSPORT AND DUMPING APPARATUS AND METHOD

FIELD OF THE INVENTION

The present invention relates to a slag dumping apparatus, and more particularly, to a slag transport and dumping apparatus and method for use in transporting high temperature slag over ground from a steel making furnace to a slag dumping area.

BACKGROUND OF THE INVENTION

In the metal refining and processing industry, among others, high temperature by-products are frequently produced. In the past, it has been somewhat problematic to safely dispose of such by-products.

Slag is just one example of a high temperature by-product that is produced during the processing of metals, such as, for example in steel-producing furnaces. When slag is removed from these furnaces (e.g., for disposal), it may typically be at a temperature in the approximate order of about 1100 degrees Celsius (° C.)—though the precise temperature may vary depending on the exact processes and furnaces owing to its formation, and/or on the materials used in such furnaces. In any event, slag may heretofore have caused great harm, injury, and even death to persons coming into contact therewith. As such, it may heretofore have been desirable and/or necessary to minimize the handling of slag (and other materials of similar nature). Of course, any handling of such materials may also have required a great amount of care, with a concomitant and costly expenditure of time and effort.

In the prior art, "slagpots" may have been used to receive slag from furnaces, so as to allow rudimentary handling of the slag during transportation and/or disposal processes. Prior art slagpots may typically have been constructed as one-piece castings that had a substantially frusto-conical shape, tapering from top to bottom, with a slag carrying capacity of somewhat less than about 20 cubic meters (i.e., less than about 700 cubic feet). The aforesaid frusto-conical shaping of prior art slagpots may have been generally undesirable, insofar as it may have contributed to an inherent instability in the slagpots which may have been prone to tipping and the like—an exceedingly dangerous occurrence when dealing with very high temperature slag. Discrete supporting structures may also have been required the to engage and stabilize prior art slagpots, so as to maintained them in a slag-receiving position and/or in a slag-retaining position. Again, the use of such supporting structures may have tended to subject such structures, and any associated human operators, to significant harm and/or damage.

In addition, prior art slagpots may have been at risk of exploding when filled with high temperature slag. Such explosions may also have previously caused, for example, damage to expensive equipment, and emergency shutdowns of facilities (and the loss of productivity associated with the subsequent downtime). These likelihood of such possibilities, and the risk of serious injury or death, may be generally thought to increase in dependent relation upon the amount of slag contained in the slagpot, generally rising with the use of higher capacity slagpots. Because of the potential for life-threatening harm and permanent injury which may arise as a result of such an explosion, it may be desirable to minimize any such risk of explosion—regardless of whether such an explosion might be due to the casting process, material defects, any thermal stresses arising during a build-up of heat inside the slagpot, and/or the weight of the slag and the slagpot itself.

It may have been generally thought to be desirable to utilize a multi-stage process for the disposal of slag. In prior art multi-stage processes, slagpots may have been loaded, for example, onto a conveyor or a rail system. The slag may then have been loaded into the slagpots at a first location, such as, for example, close to the furnace, with the conveyor or rail system thereafter moving the slagpots to a second location, whereat they may have been loaded—perhaps one by one—onto a transport vehicle, possibly requiring the use of a dedicated vehicle for that purpose. In the prior art multi-stage processes, the transport vehicle may then have been used to move the slagpots to a third location, where the slag was dumped or otherwise disposed of. Prior art multi-stage processes of this general type may have entailed a large number of handling steps and may have required that the slag remain in the slagpots for a significant length of time. It may be desirable to minimize this length of time, so as to minimize any likelihood that the slag might otherwise harden as it cools. It is also possible that, when slag remains in a slagpot for a significant duration, the risk of explosion (and/or container failure to retain the slag) may increase. In addition, a greater number of moves between multiple locations may heretofore typically have involved more handling steps, possibly increasing the risk of spillage, explosion, and/or other potentially catastrophic incidents.

In the prior art, dedicated vehicles which may have been involved in loading filled slagpots onto transport vehicles, may have been provided with arms adapted to engage and move the slagpot from a rail car (or another vehicle) to a secondary (or tertiary, etc.) transport vehicle. In some instances, these arms may have been prone to breakage and/or melting under the stress and/or heat from the loaded slagpots. Such dedicated vehicles may also have tipped and/or become unstable whilst loading and/or moving the filled slagpot. Again, such unfortunate incidents could result in any one or more of the many dire consequences discussed above. Accordingly, it is highly preferable to minimize the number of handling steps and the length of any one handling step.

In some prior art systems, the transport vehicle itself may have been articulated, possibly with the aim, inter alia, of enhancing the maneuverability thereof. Unfortunately, such designs sacrifice stability and may lead to an increased risk of spillage of high temperature slag from the slagpots transported by such transport vehicles. In particular, articulated units may have had a tendency to become unbalanced, thereby increasing the potential for spillage and/or other incidents. This risk may have been increased by the aforementioned instability of the slagpots themselves. Articulated transport vehicles of this general type (and/or any transport vehicle that exhibits a high degree of instability) may have also been known to encounter serious difficulties at the dumping location, upon attempting to expel or release the high temperature slag from the carried slagpot. That is, in attempting, for example, a controlled tipping or inversion of the slagpot, so as to allow release of the slag therefrom, the transport vehicle may have itself been at risk of tipping. Parts of the transport vehicle may also have been subject to failing under the stress of the loaded slagpot. In either case, the results may heretofore have been catastrophic, particularly for the operator of the transport vehicle, and/or any persons or equipment located proximal to the dump location.

In addition, if any problems did occur with the prior art transport vehicles, subsequent to receipt of the slagpot thereon, it may heretofore have been exceedingly difficult (and/or impossible) to remove the slagpot therefrom, such that the slag therein may thereafter have solidified. In such instances, much time could be lost both in dealing with the issue of the hardened slag, and in repairing and/or replacing the transport vehicle itself.

It is an object of this invention to obviate or mitigate at least one of the above mentioned disadvantages of the prior art.

SUMMARY OF THE INVENTION

In accordance with the present invention there is disclosed a slag transport and dumping apparatus for use in transporting high temperature slag over ground from a steel making furnace to a slag dumping area. The apparatus includes a transport vehicle, a pallet, and a container lifting mechanism. The transport vehicle includes a front cab portion substantially enclosing an interior seating compartment, wheels adapted to rollably engage the ground, and a rear transport bed having a pallet interface portion. The pallet includes a pallet support frame and a dump container. The pallet support frame has at least two ground support members which are adapted to rest securely upon the ground in a substantially upright slag loading configuration. The pallet support frame also has a pallet deck that includes a rear deck portion and a transporter interface portion. The rear deck portion is provided with a container pivot portion. The transporter interface portion selectively engages the pallet interface portion of the transport vehicle in a substantially secure slag transporting configuration. The dump container is securely supported upon the pallet support frame. The dump container has an outside portion, an inside portion that defines a slag reservoir, and a rear container portion that is provided with a frame pivot portion. The frame pivot portion securely engages the container pivot portion of the pallet support frame in selectively pivotable relation. As such, the dump container is selectively pivotable about the container pivot portion between a slag retaining configuration whereat the slag reservoir is adapted to retain the slag therein, and a slag pouring configuration whereat the slag reservoir is adapted to permit release of the slag therefrom. The container lifting mechanism is securely mounted substantially adjacent to the rear transport bed of the transport vehicle. The container lifting mechanism selectively engages the dump container, and selectively pivots the dump container from the slag retaining configuration towards the slag pouring configuration. In the slag loading configuration, the slag reservoir is adapted to receive the slag, the dump container is in the slag retaining configuration, and the transport vehicle adapted to be removed from the pallet. In the slag transporting configuration, the dump container is in the slag retaining configuration, and the transport vehicle securely engages the pallet, in substantially carrying relation, such as to enable selective transport of the pallet.

According to an aspect of one preferred embodiment of the invention, the frame pivot portion and the container pivot portion may preferably, but need not necessarily, together define a container pivot axis that is oriented in a substantially lateral direction.

According to an aspect of one preferred embodiment of the invention, the dump container may preferably, but need not necessarily, impede heat transfer from the inside portion to the frame pivot portion, the pallet support frame, and/or the transport vehicle.

According to an aspect of one preferred embodiment of the invention, the transport vehicle may preferably, but need not necessarily, also include a bed lifting mechanism (which may preferably, but need not necessarily, be securely mounted substantially adjacent to the rear transport bed), preferably to selectively move the rear transport bed between a raised pallet secured configuration and a lowered pallet released configuration. In the raised pallet secured configuration, the transporter interface portion of the pallet support frame may preferably, but need not necessarily, securely engage the pallet interface portion of the transport vehicle. In the lowered pallet released configuration, the transporter interface portion of the pallet support frame may preferably, but need not necessarily, be removed from engagement with the pallet interface portion of the transport vehicle. In the slag loading configuration, the rear transport bed of the transport vehicle may preferably, but need not necessarily, be adapted to be in the pallet released configuration. In the slag transporting configuration, the rear transport bed of the transport vehicle may preferably, but need not necessarily, be in the raised pallet secured configuration.

According to an aspect of one preferred embodiment of the invention, the container lifting mechanism may preferably, but need not necessarily, include one or more telescopic dump cylinders, which may preferably, but need not necessarily, be securely and pivotably mounted to the rear transport bed of the transport vehicle. The telescopic dump cylinders may preferably, but need not necessarily, selectively engage the dump container, and may preferably, but need not necessarily, selectively pivot the dump container from the slag retaining configuration towards the slag pouring configuration.

According to an aspect of one preferred embodiment of the invention, in the slag loading configuration, the telescopic dump cylinders may preferably, but need not necessarily, be removed from engagement with the dump container. The outside portion of the dump container may preferably, but need not necessarily, be provided with one or more lifting receptacles that engage the telescopic dump cylinders during the aforesaid selective pivoting of the dump container from the slag retaining configuration towards the slag pouring configuration.

According to an aspect of one preferred embodiment of the invention, the transporter interface portion and the pallet interface portion may preferably, but need not necessarily, be together provided with mating guide members to substantially align the lifting receptacles of the dump container with the telescopic dump cylinders when the pallet is in the slag transporting configuration.

According to an aspect of one preferred embodiment of the invention, the inside portion of the dump container may preferably, but need not necessarily, incline in a substantially upward direction towards the rear container portion.

According to an aspect of one preferred embodiment of the invention, the dump container may preferably, but need not necessarily, have a front container portion that is provided with a splash protection canopy which extends at least partially over the front cab portion of the transport vehicle when the pallet is in the slag transporting configuration.

According to an aspect of one preferred embodiment of the invention, the inside portion of the dump container may preferably, but need not necessarily, be shaped to define a dump opening substantially adjacent to the rear container portion. The pallet may preferably, but need not necessarily, also have a tailgate mechanism that includes a rear door securely mounted on the dump container substantially adjacent to the rear container portion. The rear door may preferably, but need not necessarily, be slidably movable between a closed configuration and an open configuration. Preferably, in the closed configuration, the dump container is in the slag retaining configuration, the rear door substantially occludes the dump opening, and the rear door is adapted to retain the slag in the slag reservoir. Preferably, in the open configuration, the dump opening is substantially unobstructed by the rear door, and the dump container is in the slag pouring configuration.

According to an aspect of one preferred embodiment of the invention, the pallet support frame may preferably, but need not necessarily, have at least one link bracket. Each such link bracket may preferably, but need not necessarily, be securely mounted substantially adjacent to the rear deck portion. The outside portion of the dump container may preferably, but need not necessarily, be provided with at least one lift arm pivot member. The tailgate mechanism may preferably, but need not necessarily, also have at least one link arm and/or at least one lift arm. Each such link arm may preferably, but need not necessarily, have a lift end portion, and a frame end portion pivotably mounted on one of the link brackets. Each lift arm may preferably, but need not necessarily, have a door end portion pivotably mounted to the rear door, a link end portion pivotably mounted on the lift end portion of a corresponding one of the link arms, and an intermediate container pivot portion pivotably mounted on a corresponding one of the lift arm pivot members of the dump container. Pivoting of the dump container, between the slag retaining configuration and the slag pouring configuration, may preferably, but need not necessarily, pivot the link arm about the link bracket and the lift arm about the lift arm pivot member, so as to slide the rear door between the closed configuration and the open configuration.

According to an aspect of one preferred embodiment of the invention, the rear container portion may preferably, but need not necessarily, be provided with two opposing door guide rails, each substantially adjacent to the dump opening. The rear door may preferably, but need not necessarily, be slidably received between the door guide rails.

According to an aspect of one preferred embodiment of the invention, the rear container portion may preferably, but need not necessarily, be provided with one or more wedge lock members, each substantially adjacent to a bottom end portion of the dump opening. The rear door may preferably, but need not necessarily, be securely received within the wedge lock members in the closed configuration.

According to an aspect of one preferred embodiment of the invention, the rear door may preferably, but need not necessarily, have at least one door pin. The door end portion of the lift arm may preferably, but need not necessarily, be shaped to define a lift arm track therein. The lift arm track may preferably, but need not necessarily, be slidably and pivotably mounted to the door pin, such that the door pin slides and pivots within the lift arm track when the lift arm pivots about the lift arm pivot member.

According to an aspect of one preferred embodiment of the invention, it may be preferable that the at least one link bracket includes two link brackets, the at least one lift arm pivot member includes two lift arm pivot members, the at least one link arm includes two link arms, the at least one lift arm includes two lift arms, and the at least one door pin includes two door pins. Each opposing side portion of the pallet may preferably, but need not necessarily, be provided with one of the link brackets, and cooperating ones of the lift arm pivot members, the link arms, the lift arms, and the door pins.

According to an aspect of one preferred embodiment of the invention, a dumping angle may preferably, but need not necessarily, be defined between the dump container and the pallet support frame. The outside portion of the dump container may preferably, but need not necessarily, be provided with at least one lift arm locking member. The link end portion of the lift arm may preferably, but need not necessarily, be provided with a container locking extension that engages the lift arm locking member in the slag pouring configuration, so as to restrict pivoting of the dump container beyond a predetermined maximum value for the dumping angle.

According to an aspect of one preferred embodiment of the invention, the predetermined maximum value for the dumping angle may preferably, but need not necessarily, be substantially in the order of about 58 degrees.

According to an aspect of one preferred embodiment of the invention, the rear door may preferably, but need not necessarily, be provided with external seals to seal the rear door over the dump opening in the closed configuration.

According to an aspect of one preferred embodiment of the invention, the rear door may preferably, but need not necessarily, be adapted to substantially shear residual deposits of the slag from the rear container portion, substantially adjacent to the dump opening, when the rear door moves from the open configuration towards the closed configuration whilst the dump container pivots from the slag pouring configuration towards the slag retaining configuration.

According to an aspect of one preferred embodiment of the invention, the bed lifting mechanism may preferably, but need not necessarily, include one or more elevating cylinders securely mounted to the rear transport bed. The elevating cylinders may preferably, but need not necessarily, selectively raise and/or lower the rear transport bed between the pallet secured configuration and the pallet released configuration.

According to an aspect of one preferred embodiment of the invention, the apparatus may preferably, but need not necessarily, also include one or more locking cylinders securely mounted substantially adjacent to the rear transport bed. The locking cylinders may preferably, but need not necessarily, selectively lock the transporter interface portion of the pallet support frame to the pallet interface portion of the transport vehicle prior to pivoting the dump container from the slag retaining configuration toward the slag pouring configuration.

In accordance with the present invention there is also disclosed a slag dumping pallet apparatus, for use in dumping high temperature slag, which is also for operative use with a transport vehicle. The transport vehicle includes a front cab portion substantially enclosing an interior seating compartment, wheels adapted to rollably engage the ground, a rear transport bed having a pallet interface portion, and a container lifting mechanism securely mounted substantially adjacent to the rear transport bed. The apparatus includes a pallet support frame and a dump container. The pallet support frame has at least two ground support members adapted to rest securely upon the ground in a substantially upright slag loading configuration. The pallet support frame also has a pallet deck that includes a rear deck portion and a transporter interface portion. The rear deck portion is provided with a container pivot portion. The transporter interface portion is adapted for selective operative engagement with the pallet interface portion of the transport vehicle in a substantially secure slag transporting configuration. The dump container is securely supported upon the pallet support frame. The dump container has an outside portion, an inside portion that defines a slag reservoir, and a rear container portion that is provided with a frame pivot portion. The frame pivot portion securely engages the container pivot portion of the pallet support frame in selectively pivotable relation. As such, the dump container is selectively pivotable about the container pivot portion between a slag retaining configuration whereat the slag reservoir is adapted to retain the slag therein, and a slag pouring configuration whereat the slag reservoir is adapted to permit release of the slag therefrom. The dump container is adapted for operative and selective engagement with the container lifting mechanism to selectively pivot the dump container from the slag retaining configuration towards the slag pouring configuration. In the slag loading configuration, the slag reservoir is adapted to receive the slag, the dump container is in the slag retaining configuration, and the pallet is adapted to be operatively removed from the transport vehicle. In the slag transporting configuration, the dump container is in the slag retaining configuration, and the pallet is adapted to securely engage the transport vehicle, in substantially carrying relation, such as to enable selective operative transport of the pallet.

According to an aspect of one preferred embodiment of the invention, the frame pivot portion and the container pivot portion may preferably, but need not necessarily, together define a container pivot axis that is oriented in a substantially lateral direction.

According to an aspect of one preferred embodiment of the invention, the dump container may preferably, but need not necessarily, impede heat transfer from the inside portion to each of the frame pivot portion and the pallet support frame.

According to an aspect of one preferred embodiment of the invention, in the slag loading configuration, the dump container may preferably, but need not necessarily, be operatively removed from the container lifting mechanism. The outside portion of the dump container may preferably, but need not necessarily, be provided with one or more lifting receptacles that are adapted to operatively engage the container lifting mechanism during the aforesaid selective pivoting of the dump container from the slag retaining configuration towards the slag pouring configuration.

According to an aspect of one preferred embodiment of the invention, the transporter interface portion may preferably, but need not necessarily, be provided with guide members to matingly engage the pallet interface portion of the transport vehicle, and to substantially align the lifting receptacles of the dump container with the container lifting mechanism when the pallet is in the slag transporting configuration.

According to an aspect of one preferred embodiment of the invention, the inside portion of the dump container may preferably, but need not necessarily, incline in a substantially upward direction towards the rear container portion.

According to an aspect of one preferred embodiment of the invention, the dump container may preferably, but need not necessarily, have a front container portion that is provided with a splash protection canopy. The splash protection canopy may preferably, but need not necessarily, be adapted to operatively extend at least partially over the front cab portion of the transport vehicle when the pallet is in the slag transporting configuration.

According to an aspect of one preferred embodiment of the invention, the inside portion of the dump container may preferably, but need not necessarily, be shaped to define a dump opening substantially adjacent to the rear container portion. The pallet also has a tailgate mechanism that may preferably, but need not necessarily, include a rear door securely mounted on the dump container substantially adjacent to the rear container portion. The rear door may preferably, but need not necessarily, be slidably movable between a closed configuration and an open configuration. Preferably, in the closed configuration, the dump container is in the slag retaining configuration, the rear door substantially occludes the dump opening, and/or the rear door is adapted to retain the slag in the slag reservoir. Preferably, in the open configuration, the dump opening is substantially unobstructed by the rear door, and/or the dump container is in the slag pouring configuration.

According to an aspect of one preferred embodiment of the invention, the pallet support frame may preferably, but need not necessarily, include at least one link bracket. Each such link bracket may preferably, but need not necessarily, be securely mounted substantially adjacent to the rear deck portion. The outside portion of the dump container may preferably, but need not necessarily, be provided with at least one lift arm pivot member. The tailgate mechanism may preferably, but need not necessarily, also include at least one link arm and/or at least one lift arm. Each such link arm may preferably, but need not necessarily, have a lift end portion, and a frame end portion pivotably mounted on one the link bracket. Each lift arm may preferably, but need not necessarily, have a door end portion pivotably mounted to the rear door, a link end portion pivotably mounted on the lift end portion of a corresponding one of the link arms, and an intermediate container pivot portion pivotably mounted on a corresponding one the lift arm pivot members of the dump container. Pivoting of the dump container, between the slag retaining configuration and the slag pouring configuration, may preferably, but need not necessarily, pivot the link arm about the link bracket and the lift arm about the lift arm pivot member, so as to slide the rear door between the closed configuration and the open configuration.

According to an aspect of one preferred embodiment of the invention, the rear container portion may preferably, but need not necessarily, be provided with two opposing door guide rails, each substantially adjacent to the dump opening. The rear door may preferably, but need not necessarily, be slidably received between the door guide rails.

According to an aspect of one preferred embodiment of the invention, the rear container portion may preferably, but need not necessarily, be provided with one or more wedge lock members, each substantially adjacent to a bottom end portion of the dump opening. The rear door is securely received within the wedge lock members in the closed configuration.

According to an aspect of one preferred embodiment of the invention, the rear door may preferably, but need not necessarily, include at least one door pin. The door end portion of the lift arm may preferably, but need not necessarily, be shaped to define a lift arm track therein. The lift arm track may preferably, but need not necessarily, be slidably and pivotably mounted to the door pin, such that the door pin slides and pivots within the lift arm track when the lift arm pivots about the lift arm pivot member.

According to an aspect of one preferred embodiment of the invention, it may be preferable that the at least one link bracket includes two link brackets, the at least one lift arm pivot member includes two lift arm pivot members, the at least one link arm includes two link arms, the at least one lift arm includes two lift arms, and the at least one door pin includes two door pins. Each opposing side portion of the pallet may preferably, but need not necessarily, be provided with one of the link brackets, and cooperating ones of the lift arm pivot members, the link arms, the lift arms, and the door pins.

According to an aspect of one preferred embodiment of the invention, a dumping angle may preferably, but need not necessarily, be defined between the dump container and the pallet support frame. The outside portion of the dump container may preferably, but need not necessarily, be provided with at least one lift arm locking member. The link end portion of the lift arm may preferably, but need not necessarily, be provided with a container locking extension that engages the lift arm locking member in the slag pouring configuration, so as to restrict pivoting of the dump container beyond a predetermined maximum value for the dumping angle.

According to an aspect of one preferred embodiment of the invention, the predetermined maximum value for the dumping angle may preferably, but need not necessarily, be substantially in the order of about 58 degrees.

According to an aspect of one preferred embodiment of the invention, the rear door may preferably, but need not necessarily, be provided with external seals to seal the rear door over the dump opening in the closed configuration.

According to an aspect of one preferred embodiment of the invention, the rear door may preferably, but need not necessarily, be adapted to substantially shear residual deposits of the slag from the rear container portion, substantially adjacent to the dump opening, when the rear door moves from the open configuration towards the closed configuration whilst the dump container pivots from the slag pouring configuration towards the slag retaining configuration.

In accordance with the present invention there is additionally disclosed a method of transporting and dumping high temperature slag, the method includes a slag pouring step, a slag transporting step, and a slag dumping step. In the slag pouring step, the slag is poured, from substantially adjacent to a steel making furnace, into a slag reservoir which is defined by an inside portion of a dump container that is securely supported upon a pallet support frame. The slag reservoir receives and retains the slag therein in a slag retaining configuration. In the slag transporting step, a transport vehicle, having a rear transport bed that securely engages the pallet support frame, is used to substantially carry the pallet support frame and the dump container, and to transport the slag in the slag reservoir over ground to substantially adjacent to a slag dumping area. In the slag dumping step, the slag is dumped substantially adjacent to the slag dumping area. In the slag dumping step, a container lifting mechanism, securely mounted substantially adjacent to the rear transport bed of the transport vehicle, pivots the dump container, about a pivotable engagement between the dump container and the pallet support frame adjacent respective rear portions thereof, from the slag retaining configuration towards a slag pouring configuration whereat the slag reservoir permits release of the slag therefrom.

According to an aspect of one preferred embodiment of the invention, in the slag pouring step, the transport vehicle may preferably, but need not necessarily, be removed from the pallet support frame and at least two ground support members of the pallet support frame may preferably, but need not necessarily, rest securely upon the ground.

According to an aspect of one preferred embodiment of the invention, the method may preferably, but need not necessarily, also include a pallet support frame engaging step, before the slag transporting step, of moving the transport vehicle into a pallet released configuration whereat the rear transport bed is beneath the pallet support frame. In the pallet released configuration, the rear transport bed may preferably, but need not necessarily, be removed from engagement with the pallet support frame. In the pallet support frame engaging step, the rear transport bed may preferably, but need not necessarily, be raised from the pallet released configuration to a pallet secured configuration, whereat the rear transport bed securely engages the pallet support frame. As such, the rear transport bed may preferably, but need not necessarily, be in the pallet secured configuration during the slag transporting step.

According to an aspect of one preferred embodiment of the invention, the method may preferably, but need not necessarily, also include a lifting mechanism engagement step, before the slag dumping step, of bringing the container lifting mechanism into engagement with the dump container.

According to an aspect of one preferred embodiment of the invention, in the lifting mechanism engagement step, one or more telescopic dump cylinders of the container lifting mechanism may preferably, but need not necessarily, be brought into engagement with corresponding lifting receptacles provided on an outside portion of the dump container. In the slag dumping step, the telescopic dump cylinders may preferably, but need not necessarily, pivot the dump container from the slag retaining configuration towards the slag pouring configuration as aforesaid.

According to an aspect of one preferred embodiment of the invention, in the pallet support frame engaging step, guide members provided on the pallet support frame may preferably, but need not necessarily, matingly engage the rear transport bed, so as to substantially align the lifting receptacles of the dump container with the telescopic dump cylinders of the container lifting mechanism.

According to an aspect of one preferred embodiment of the invention, the method may preferably, but need not necessarily, also include a door opening step, occurring substantially contemporaneously with the slag dumping step as the dump container pivots as aforesaid from the slag retaining configuration towards the slag pouring configuration. In the door opening step, a rear door of a tailgate mechanism, which may preferably be securely mounted on the dump container substantially adjacent to a rear dump opening thereof, may preferably, but need not necessarily, be slidingly moved from a closed configuration towards an open configuration. Preferably, in the closed configuration, the dump container is in the slag retaining configuration, the rear door substantially occludes the dump opening, and the rear door is adapted to retain the slag in the slag reservoir. Preferably, in the open configuration, the dump opening is substantially unobstructed by the rear door, and the dump container is in the slag pouring configuration.

According to an aspect of one preferred embodiment of the invention, in the door opening step, the aforesaid pivoting of the dump container towards the slag pouring configuration may preferably, but need not necessarily, cause pivoting of a link arm about a link bracket that is mounted to the pallet support frame. The aforesaid pivoting of the link arm may preferably, but need not necessarily, cause pivoting of a lift arm, relative to the link arm, about a lift arm pivot member that is mounted to an outside portion of the dump container and pivotably mounted to an intermediate container pivot portion of the lift arm. In this manner, the rear door may preferably, but need not necessarily, be slid from the closed configuration towards the open configuration.

According to an aspect of one preferred embodiment of the invention, in the door opening step, the rear door may preferably, but need not necessarily, slidingly move between door guide rails provided substantially adjacent to the dump opening.

According to an aspect of one preferred embodiment of the invention, in the door opening step, when the lift arm pivots about the lift arm pivot member, a door pin provided on the rear door may preferably, but need not necessarily, slidingly and pivotingly move within a lift arm track that is defined by a door end portion of the lift arm.

According to an aspect of one preferred embodiment of the invention, the slag pouring step may preferably, but need not necessarily, include a pivot stopping step of engaging a locking extension, provided on a link end portion of the lift arm, with a locking member that is provided on the dump container. This engagement may preferably, but need not necessarily, restrict pivoting of the dump container beyond a predetermined maximum value for a dumping angle which is preferably defined between the dump container and the pallet support frame.

According to an aspect of one preferred embodiment of the invention, in the pivot stopping step, the predetermined maximum value for the dumping angle may preferably, but need not necessarily, be substantially in the order of about 58 degrees.

According to the invention, the apparatus and method of this invention obviate and/or mitigate at least one of the above mentioned disadvantages of the prior art.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

DETAILED DESCRIPTION OF A PREFERRED EMBODIMENT

Figure 1:
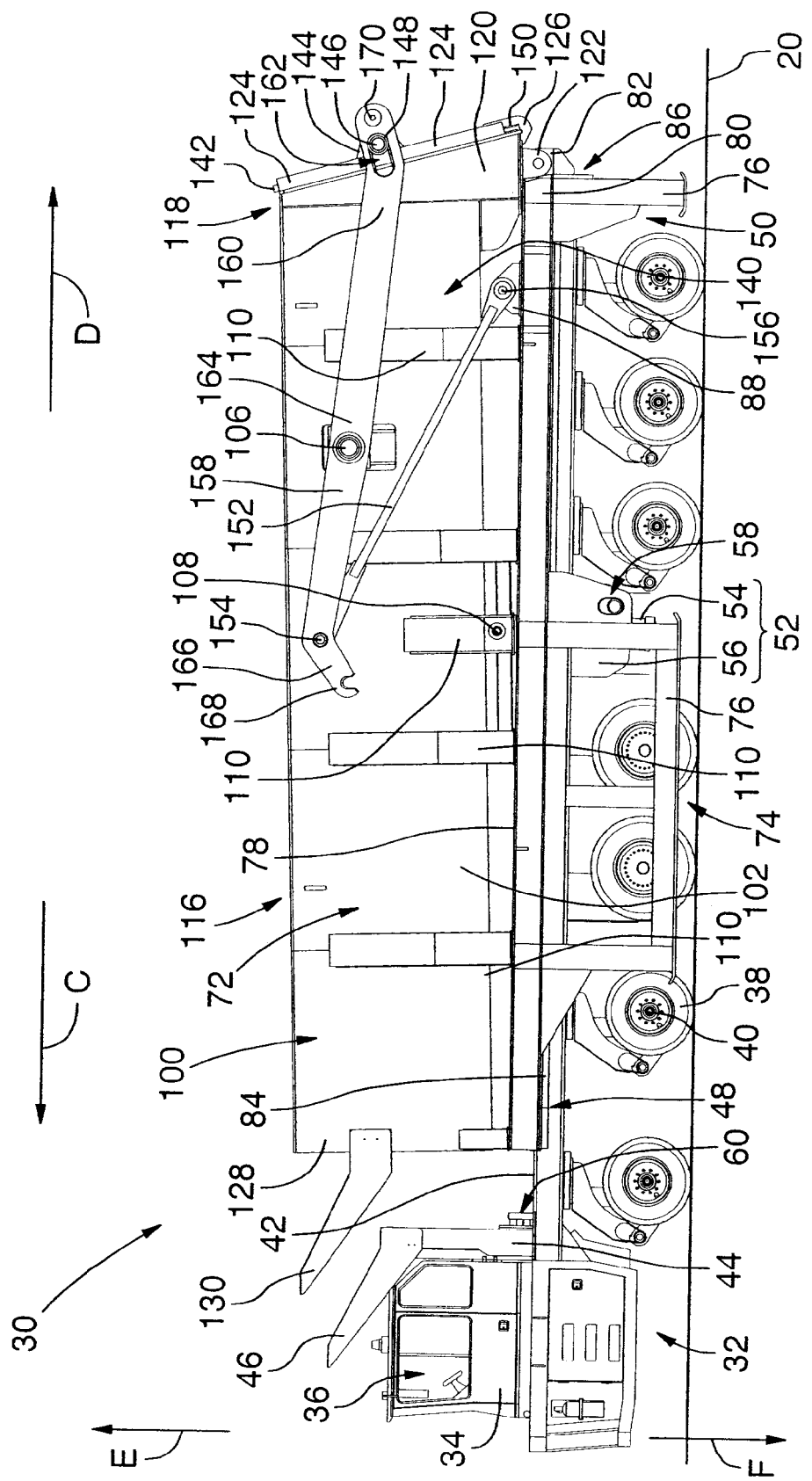
FIG. 1 of the drawings appended hereto is a left side elevational view of a preferred embodiment of a transporter vehicle and pallet apparatus according to the invention, shown in a slag transporting configuration.
Figure 2:
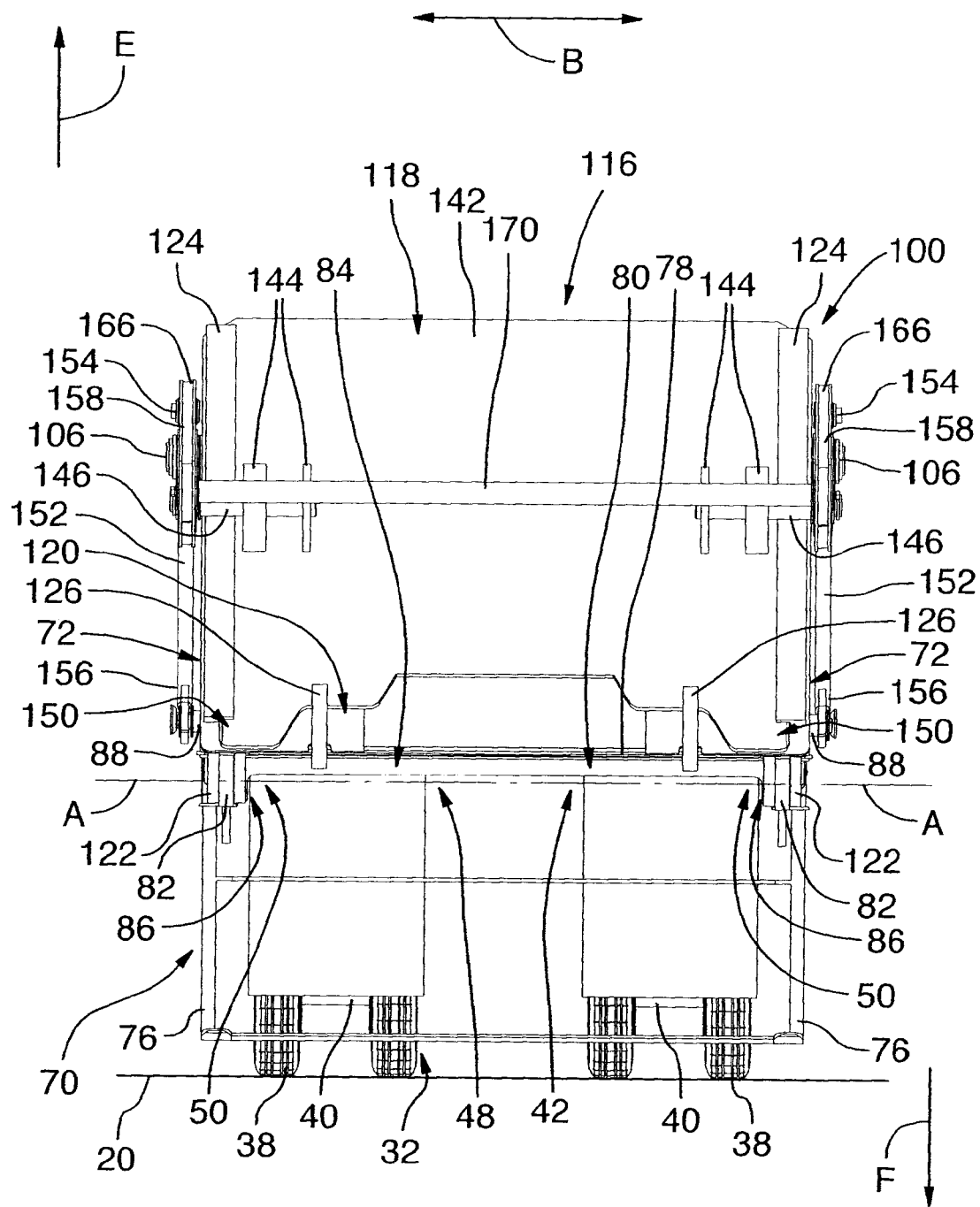
FIG. 2 of the drawings is a rear elevational view of the apparatus of FIG. 1.

Referring now to FIGS. 1 and 2 of the drawings, there is shown a slag transport and dumping apparatus 30, according to a preferred embodiment of the invention, which may be used to transport high temperature slag 22 over the ground 20 from a steel making furnace (not shown) to a slag dumping area (not shown). The apparatus 30 includes a transport vehicle 32, a pallet 70, and a container lifting mechanism 52.

Figure 7:
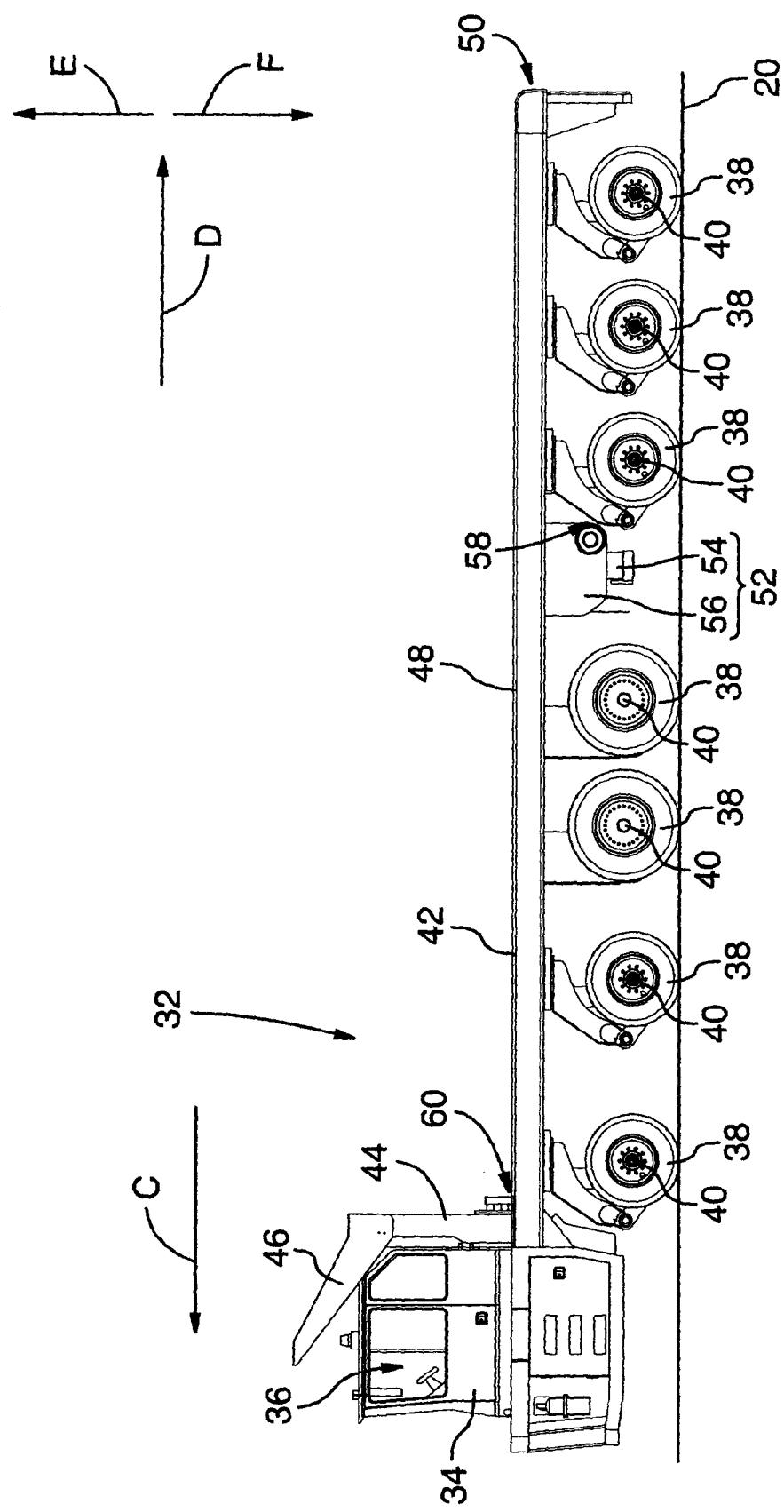
FIG. 7 of the drawings is a left side elevational view of a transport vehicle for use with the apparatus of FIG. 3.

The transport vehicle 32 includes a front cab portion 34, wheels 38, and a rear transport bed 42. The front cab portion 34 substantially encloses an interior seating compartment 36 which is preferably sized to accommodate a driver (not shown). The wheels 38 are supported on axles 40 and are adapted to rollably engage the ground 20. As best shown in FIG. 7, the rear transport bed 42 includes a front bed wall 44 and a pallet interface portion 48. The front bed wall 44 is preferably provided with a cab awning 46 that extends at least part-way over the front cab portion 34 to provide a measure of protection for a driver (not shown) situated within the interior seating compartment 36.

Figure 3:
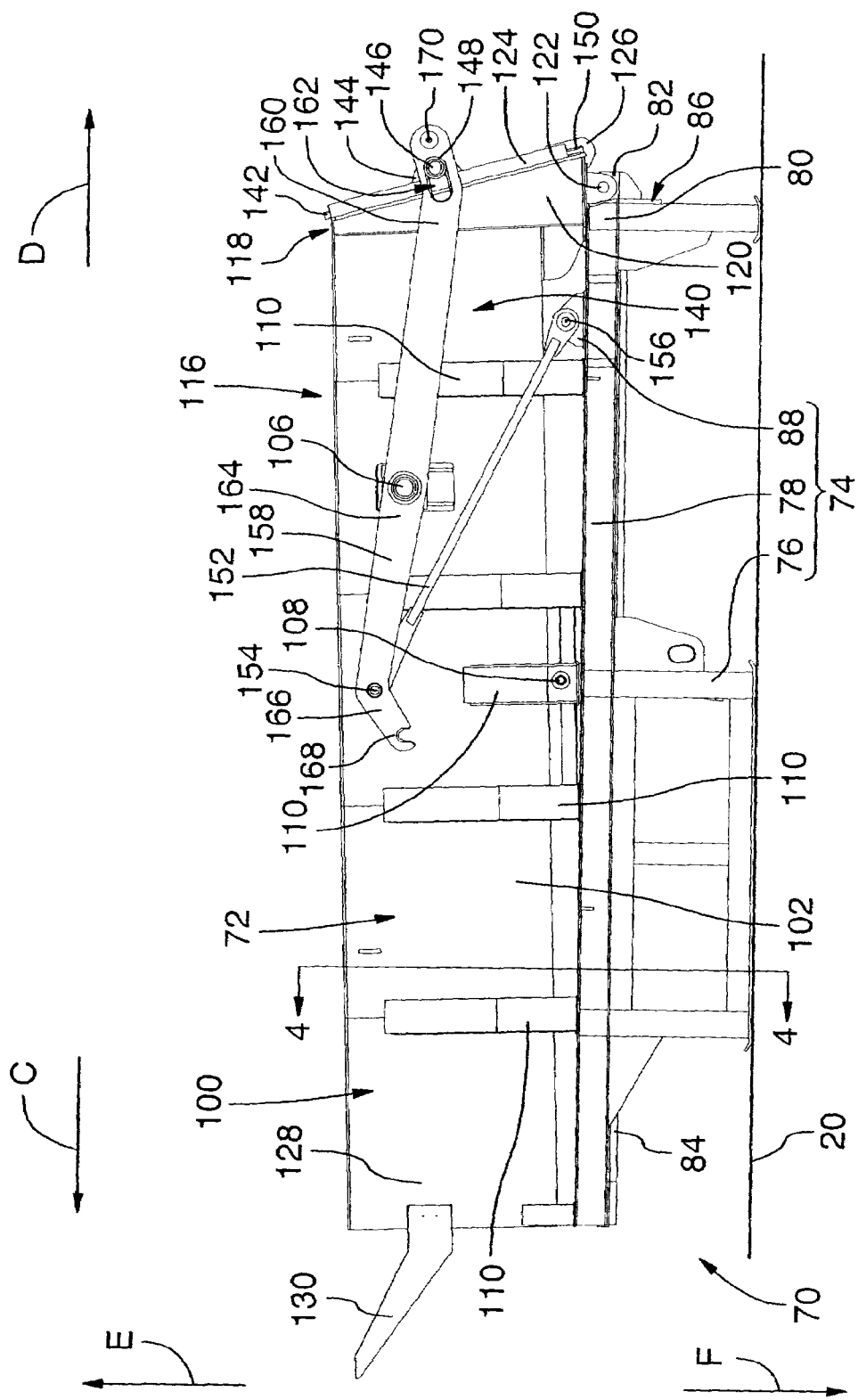
FIG. 3 of the drawings is a left side elevational view of a preferred embodiment of a pallet apparatus according to the invention, shown in a slag loading configuration.
Figure 4:
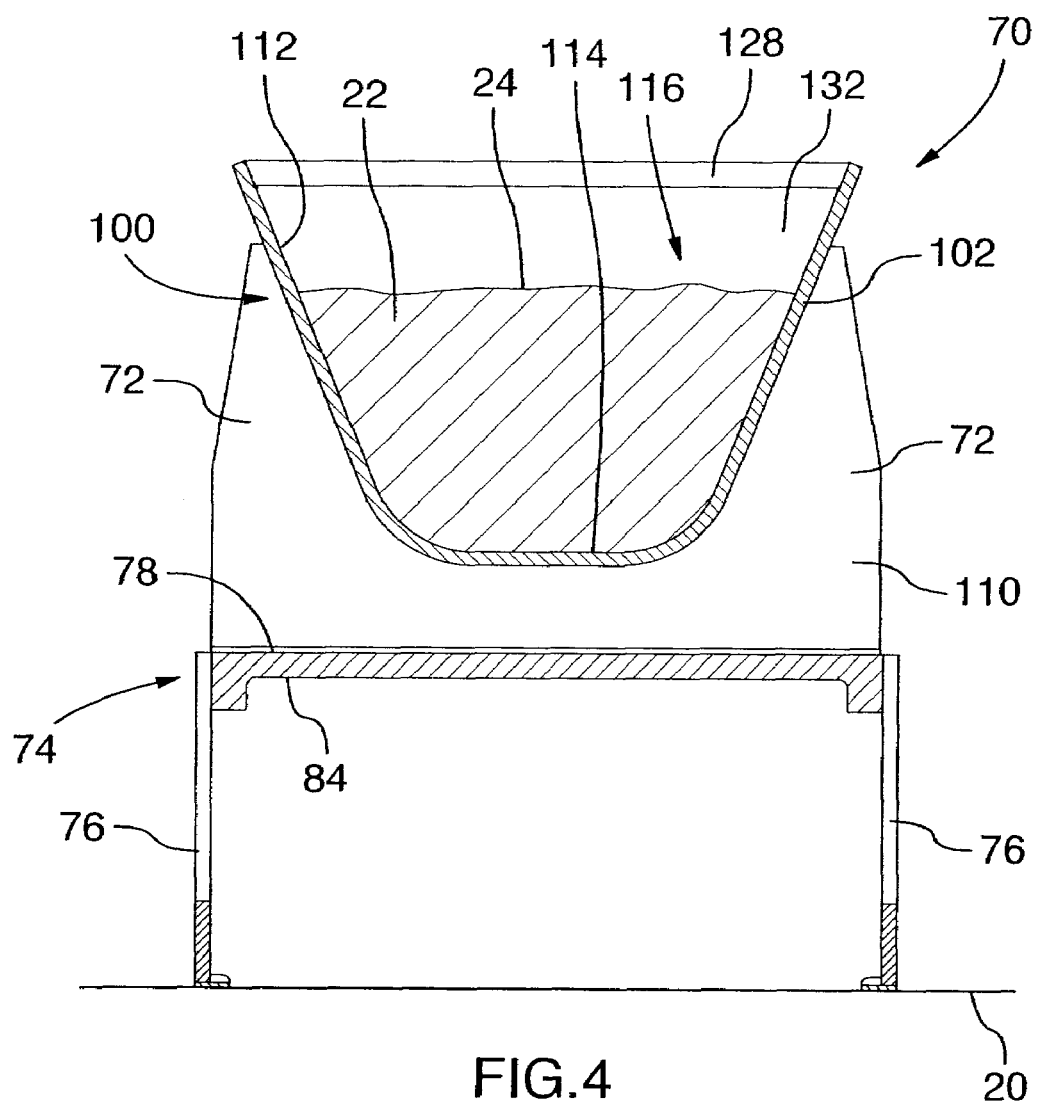
FIG. 4 of the drawings is a sectional rear view along sight line 4-4 of FIG. 3.
Figure 5:
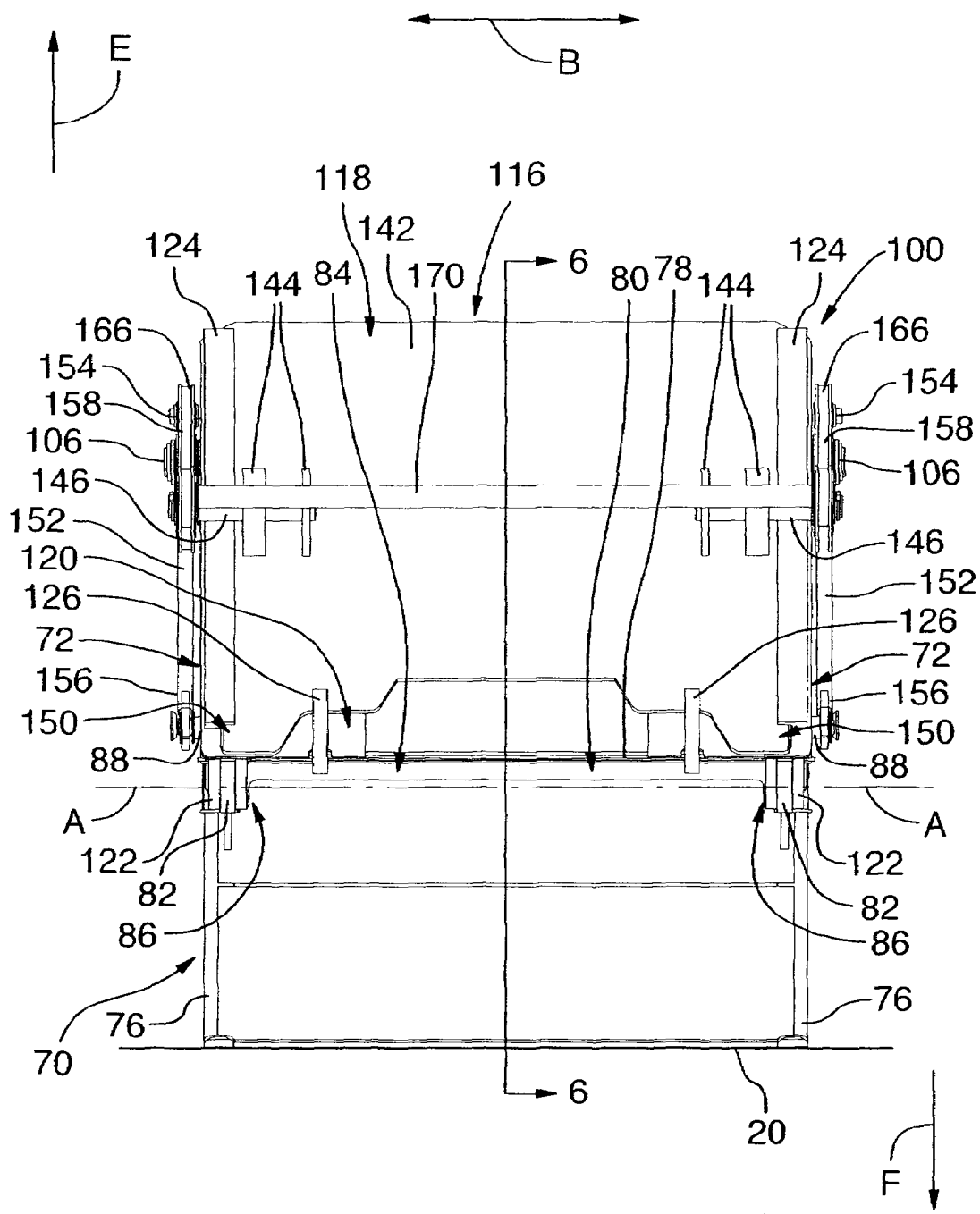
FIG. 5 of the drawings is a rear elevational view of the apparatus of FIG. 3.
Figure 6:
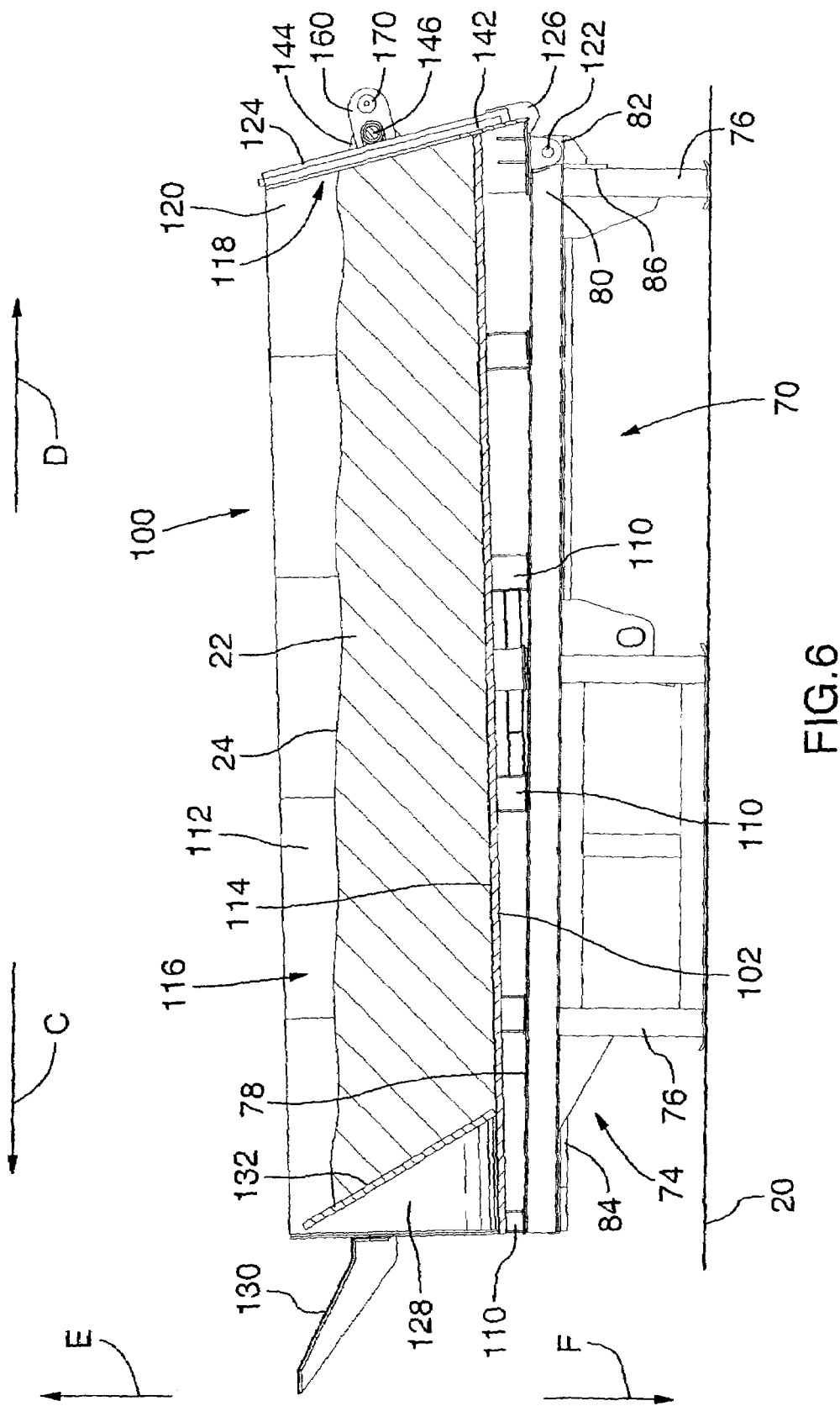
FIG. 6 of the drawings is a sectional left side view along sight line 6-6 of FIG. 5.

As best seen in FIG. 3 to 6, the pallet 70 has two opposing side portions 72,72, and includes a pallet support frame 74, a dump container 100, and a tailgate mechanism 140. As best shown in FIGS. 3 and 6, the pallet support frame 74 has a pallet deck 78 that includes a rear deck portion 80 and a transporter interface portion 84. The rear deck portion 80 is provided with a container pivot portion 82 (as shown in FIGS. 1-3, 5-6 and 10). The transporter interface portion 84 selectively engages the pallet interface portion 48 of the transport vehicle 32 (as best shown in FIG. 1).

As best seen in FIGS. 3 to 6, the dump container 100 of the pallet 70 has an outside portion 102, an inside portion 112, a rear container portion 120, and a front container portion 128. As best shown in FIGS. 4 and 6, the inside portion 112 of the dump container 100 defines a slag reservoir 116. As shown in FIG. 6, an inside bottom surface 114 of the slag reservoir 116 inclines in a substantially upward direction (as indicated generally by arrow "E") as it extends, in a substantially rearward direction (as indicated generally by arrow "D"), towards the rear container portion 120.

As shown in FIGS. 1-6 and 10, a plurality of container support members 110 are securely mounted to the outside portion 102 of the dump container 100. As best seen in FIGS. 1 to 6, the support members 110 are adapted to securely support the dump container 100 upon the rear deck portion 80 of the pallet support frame 74.

As shown in FIGS. 1-3, 5-6 and 10, the rear container portion 120 of the dump container 100 is provided with a frame pivot portion 122. The frame pivot portion 122 securely engages the container pivot portion 82 of the pallet support frame 74 in selectively pivotable relation. As shown in FIGS. 2 and 5, the frame pivot portion 122 and the container pivot portion 82 together define a container pivot axis A-A that is oriented in a substantially lateral direction (as indicated generally by arrow "B").

Figure 8:
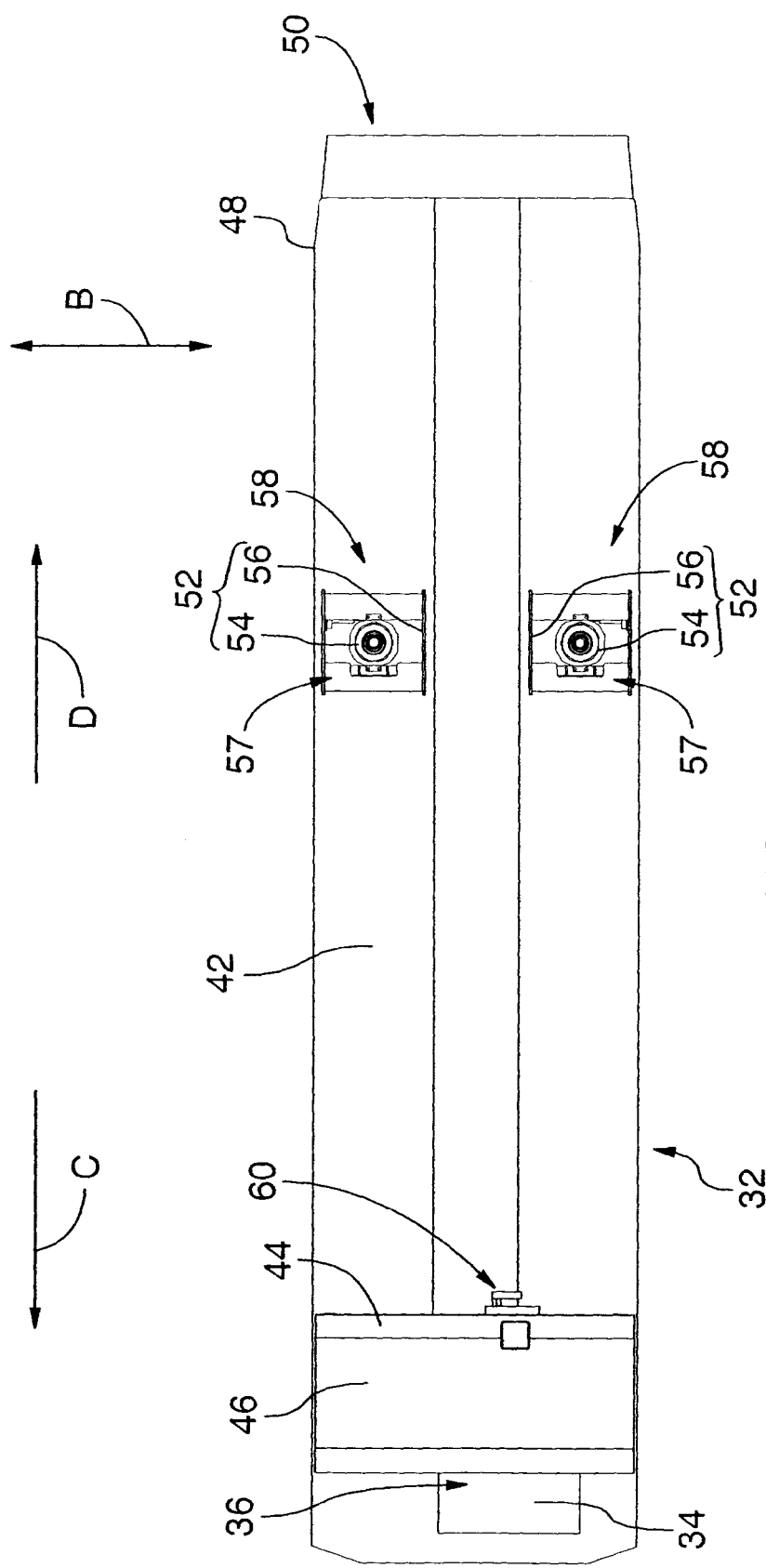
FIG. 8 of the drawings is a top plan view of the vehicle of FIG. 7.
Figure 9:
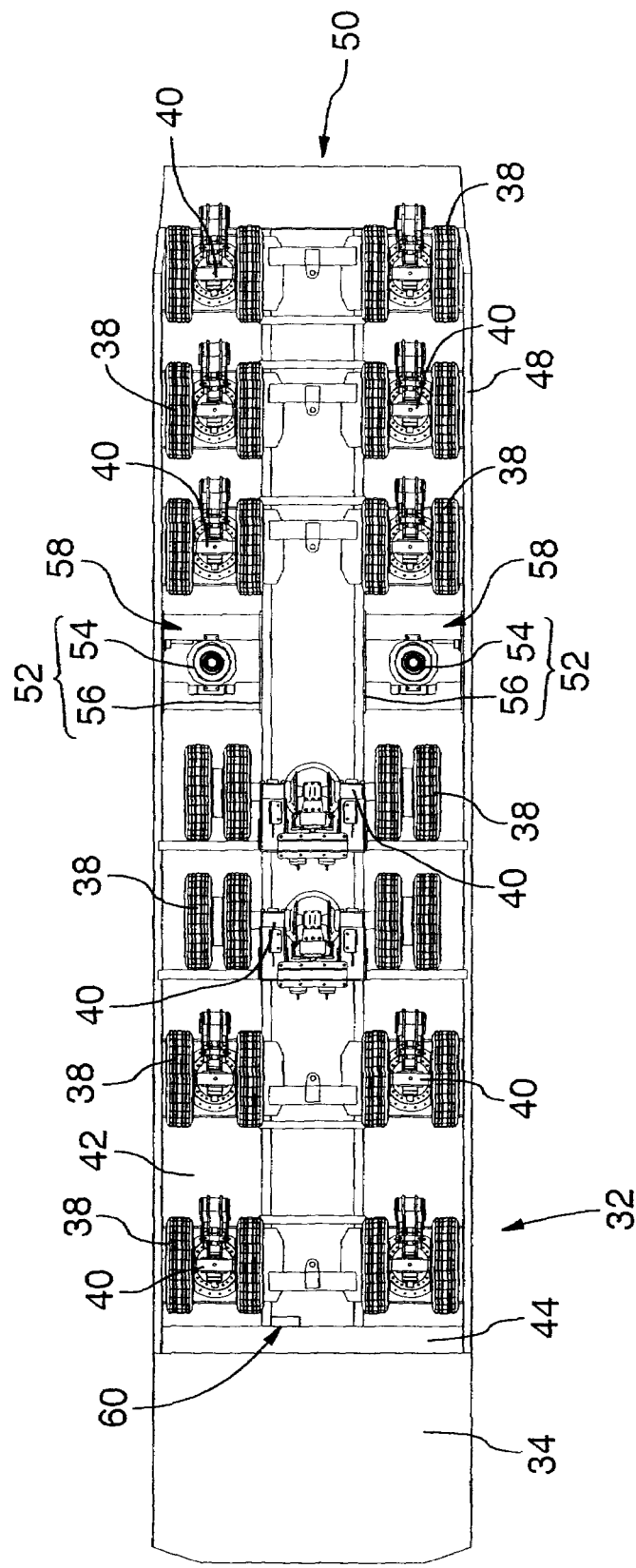
FIG. 9 of the drawings a bottom view of the vehicle of FIG. 7.

As best seen in FIGS. 7 to 9, a container lifting mechanism 52 is securely mounted substantially adjacent to the rear transport bed 42 of the transport vehicle 32. Preferably, the container lifting mechanism 52 includes two telescopic dump cylinders 54 which are securely and pivotably mounted to the rear transport bed 42 by hangers 56.

Figure 10:
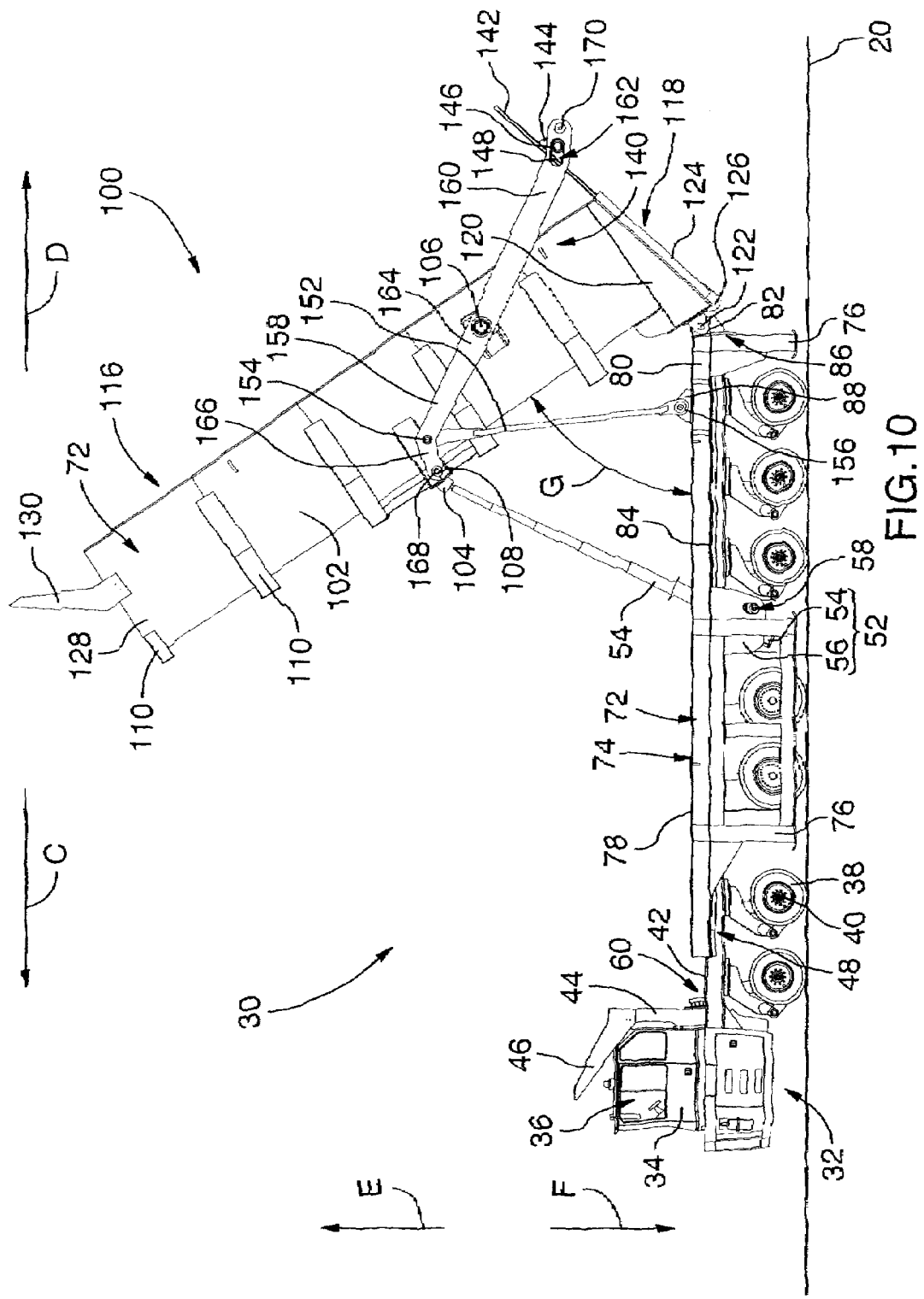
FIG. 10 of the drawings is a side elevational view of the apparatus of FIG. 1, shown in a slag pouring configuration.

The outside portion 102 of the dump container 100 is preferably provided with two lifting receptacles 104 which, as best seen in FIG. 10, are adapted to securely receive the dump cylinders 54 therein. That is, the telescopic dump cylinders 54 of the container lifting mechanism 52 selectively engage the lifting receptacles 104 of the dump container 100.

Two link brackets 88 are preferably securely mounted on the pallet support frame 74, as best seen in FIGS. 2 and 5. Each of the link brackets 88 is mounted substantially adjacent to one opposing side portion 72 of the pallet 70. As best seen in FIGS. 1, 3 and 10, wherein a representative one of the brackets 88 is shown, each of the link brackets 88 is also mounted substantially adjacent to the rear deck portion 80 of the pallet support frame 74.

As best seen in FIGS. 2 and 5, the outside portion 102 of the dump container 100 is provided with two lift arm pivot members 106. Each of the lift arm pivot members 106 is mounted substantially adjacent to one opposing side portion 72 of the pallet 70. As will be appreciated from a consideration of FIGS. 1, 3 and 10, wherein a representative side portion 72 of the pallet 70 is shown, the outside portion 102 of the dump container 100 is also provided with two lift arm locking members 108, each mounted substantially adjacent to one opposing side portion 72 of the pallet 70.

As best seen in FIG. 6, the inside portion 112 of the dump container 100 is shaped to define a dump opening 118 substantially adjacent to the rear container portion 120. As best seen in FIGS. 2 and 5, the rear container portion 120 is provided with two opposing door guide rails 124,124, each substantially adjacent to the dump opening 118. The rear container portion 120 is preferably also provided with two wedge lock members 126,126, each substantially adjacent to a bottom end portion of the dump opening 118 (as best seen in FIGS. 2 and 5).

As best seen in FIGS. 2 and 5, the tailgate mechanism 140 preferably includes a rear door 142, two link arms 152,152 and two lift arms 158,158. Each one of the link arms 152,152 and each one of the lift arms 158,158 is substantially adjacent to one of the opposing side portions 72,72 of the pallet 70.

As best seen in FIGS. 1, 3 and 10, the rear door 142 is securely mounted on the dump container 100 substantially adjacent to the rear container portion 120. As described in somewhat greater detail hereinbelow, the rear door 142 is slidably received between the door guide rails 124,124, and is slidably movable between a closed configuration (as best seen in FIGS. 1 and 3) and an open configuration (as shown in FIG. 10). Preferably, the rear door 142 has two door pins 146,146, each mounted to the rear door 142 on one or more door pin plates 144 (as best seen in FIGS. 2 and 5). Each one of the door pins 146,146 is mounted substantially adjacent to one of the opposing side portions 72,72 of the pallet 60.

As best seen in FIGS. 1, 3 and 10, wherein a representative link arm 152 is shown, each link arm 152 has a lift end portion 154, and a frame end portion 156 pivotably mounted on one of the link brackets 88. Each lift arm 158 has a door end portion 160, a link end portion 166, and an intermediate container pivot portion 164. The intermediate container pivot portion 164 is pivotably mounted on one of the lift arm pivot members 106 of the dump container 100. The door end portion 160 of each lift arm 158 is shaped to define a lift arm track 162 therein. Each lift arm track 162 is slidably and pivotably mounted to one of the door pins 146. (As best seen in FIGS. 2 and 5, each door pin 146 is provided with a door pin bushing 148 to securely mount the door pin 146 within the lift arm track 162.) The door end portions 160,160 of the two lift arms 158,158 are secured to one another by a lift arm stabilizer tube 170 that extends therebetween (as best seen in FIGS. 2 and 5). The link end portion 166 of each lift arm 158 is pivotably mounted on the lift end portion 154 of one of the link arms 152. The link end portion 166 of each lift arm 158 is also provided with a container locking extension 168 (as described in greater detail hereinbelow).

The transport vehicle 32 is selectively removable from the pallet 70. For this purpose, among others, the transport vehicle 32 includes a bed lifting mechanism 58 that is securely mounted substantially adjacent to the rear transport bed 42. The bed lifting mechanism 58 may preferably take the form of a number elevating cylinders (e.g., hydraulic elevating cylinders) mounted to the rear transport bed 42. The bed lifting mechanism 58 (alternately hereinafter referred to as the elevating cylinders 58) selectively raise and lower the rear transport bed 42 between a pallet secured configuration (as best seen in FIG. 1) and a pallet released configuration (not shown). In the raised pallet secured configuration, the transporter interface portion 84 of the pallet support frame 74 securely engages the pallet interface portion 48 of the transport vehicle 32. The transporter interface portion 84 and the pallet interface portion 48 are together provided with mating guide members, 86 and 50 respectively, to substantially align the lifting receptacles 104 of the dump container 100 with the telescopic dump cylinders 54 when the pallet 70 is in the pallet secured configuration.

In the lowered pallet released configuration (not shown), the transporter interface portion 84 of the pallet support frame 74 is removed, preferably in a substantially downward direction (as indicated generally by arrow "F" in FIG. 1), from engagement with the pallet interface portion 48 of the transport vehicle 32. In the pallet released configuration, and as shown in FIGS. 3 to 6, four or more ground support members 76 of the pallet support frame 74 will preferably rest securely upon the ground 20 in a substantially upright slag loading configuration. In the slag loading configuration, the telescopic dump cylinders 54 are adapted to be removed from engagement with the lifting receptacles 104 of the dump container 100, and the transport vehicle 32 is adapted to be withdrawn from beneath the pallet 70, preferably in a substantially forward direction (as indicated generally by arrow "C" in FIG. 1). Similarly, in the pallet released configuration, the rear transport bed 42 of the transport vehicle 32 is removed from the pallet 70 as aforesaid, and may withdraw from beneath the pallet 70.

Figure 11:
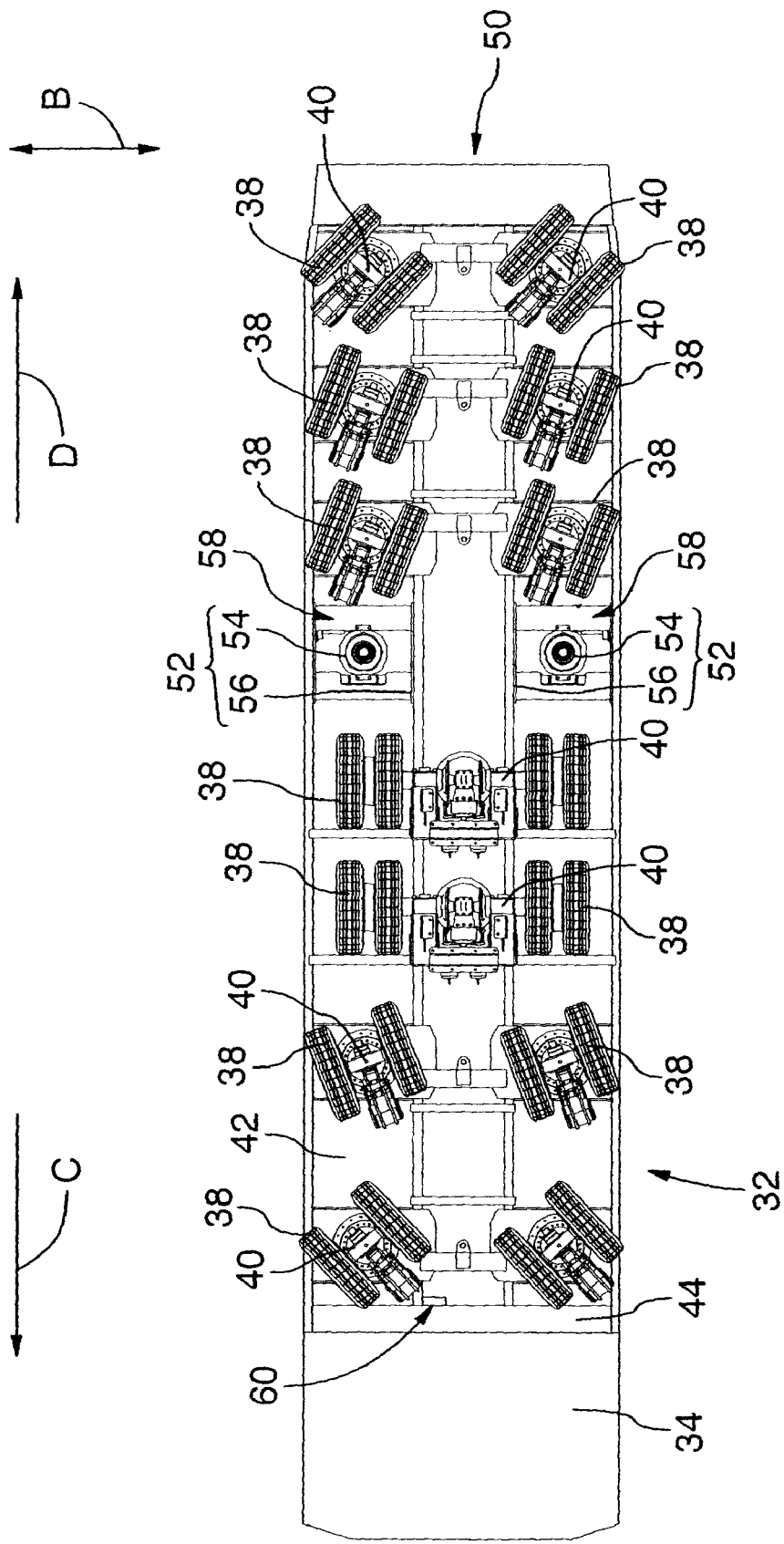
FIG. 11 of the drawings is a view, similar to FIG. 9, of the vehicle of FIG. 7, showing the wheels thereof in a independently turned positions.

Thereafter, and as best seen in FIG. 7, the rear transport bed 42 may be raised to provide greater clearance above the ground 20, so as to facilitate movement of the vehicle 32, without the pallet 70—whether to another loading site or elsewhere. Perhaps notably, and as best seen in FIG. 11, the transport vehicle 32—whether carrying the pallet 70 or not—is particularly maneuverable, due in part to independently rotatable ones of the axles 40 which support the wheels 38.

When the rear transport bed 42 is in the pallet secured configuration with the pallet 70 (as best seen in FIG. 1), the apparatus 30 may be used—in a substantially secure slag transporting configuration (which is discussed in somewhat greater detail hereinbelow)—to transport high temperature slag 22 over the ground 20.

Preferably, when the rear transport bed 42 is in the pallet secured configuration with the pallet 70 (as best seen in FIG. 1), the telescopic dump cylinders 54 of the container lifting mechanism 52 may extend through bed apertures 57 formed in the rear transport bed 42 to securely engage the lifting receptacles 104, as aforesaid. Thereafter, continued extension of the cylinders 54 will preferably selectively pivot the dump container 100, about the container pivot portion 82, from a slag retaining configuration (as best seen in FIG. 1) towards a slag pouring configuration (as best seen in FIG. 10).

In the slag retaining configuration, and as best seen in FIGS. 1 and 6, the rear door 142 is in the closed configuration, substantially occluding the dump opening 118, such that the slag reservoir 116 and the rear door 142 are together adapted to retain the slag 22 therein. In the closed configuration, and as best seen in FIGS. 1-3 and 5-6, the rear door 142 is securely received within the wedge lock members 126. External seals 150 provided on the rear door 142 seal it over the dump opening 118 in the closed configuration.

In the slag pouring configuration, and as best seen in FIG. 10, the rear door 142 is in the open configuration, leaving the dump opening 118 substantially unobstructed, such that the slag reservoir 116 and the rear door 142 permit release of the slag 22 therefrom.

Pivoting of the dump container 100, between the slag retaining configuration (best seen in FIG. 1) and the slag pouring configuration (best seen in FIG. 10), is effective to pivot the link arm 152 about the link bracket 88 and to pivot the lift arm 158 about the lift arm pivot member 106. When the lift arm 158 pivots about the lift arm pivot member 106, each door pin 146 slides and pivots within a respective one of the lift arm tracks 162, so as to slide the rear door 142 between the closed configuration (best seen in FIG. 1) and the open configuration (best seen in FIG. 10).

A dumping angle (as indicated generally by angular dimension "G" in FIG. 10) is defined between the dump container 100 and the pallet support frame 74. In the slag pouring configuration, the container locking extension 168 of each lift arm 158 engages a cooperating one of the lift arm locking members 108. As shown in FIG. 10, this engagement restricts pivoting of the dump container 100 beyond a predetermined maximum value for the dumping angle "G". Preferably, and partially in view of the aforesaid incline of the inside bottom surface 114 of the slag reservoir 116, the predetermined maximum value for the dumping angle "G" is substantially in the order of about 58 degrees, so as to provide one slag dumping angle which may be optimal.

When the dump container 100 moves from the slag pouring configuration (shown in FIG. 10) to the slag retaining configuration (shown in FIG. 1), the rear door 142 preferably moves, under influence of the lift arms 158,158 and the link arms 152,152, from the open configuration to the closed configuration. Now, whilst the dump container 100 pivots from the slag pouring configuration towards the slag retaining configuration, and the rear door 142 moves from the open configuration (shown in FIG. 10) towards the closed configuration (shown in FIG. 1), the rear door 142 substantially shears residual deposits (not shown) of the slag 22 from the rear container portion 120, substantially adjacent to the dump opening 118.

In the slag loading configuration shown in FIGS. 3 to 6, the dump container 100 is in the slag retaining configuration, such that the slag reservoir 116 is adapted to receive the slag 22. The slag reservoir 116 is provided with a thick metal front plate 132 substantially adjacent to the front container portion 128, such that the slag 22, below a slag surface 24, is retained by the inside bottom surface 114, the front plate 132, and the rear door 142.

In the slag transporting configuration (best seen in FIG. 1), the dump container 100 is in the slag retaining configuration, and the rear transport bed 42 of the transport vehicle 32 securely engages the pallet 70, in the raised pallet secured configuration and in substantially carrying relation, such as to enable selective transport of the pallet 70.

The front container portion 128 of the dump container 100 is provided with a splash protection canopy 130. The splash protection canopy 130 extends at least partially over the front cab portion 34 of the transport vehicle 32 when the pallet 70 is in the slag transporting configuration (as shown in FIG. 1) to provide an additional measure of protection for the driver (not shown) situated within the interior seating compartment 36.

The apparatus 30 also includes one or more locking cylinders 60 securely mounted substantially adjacent to the rear transport bed 42. The locking cylinders 60 selectively lock the transporter interface portion 84 of the pallet support frame 74 to the pallet interface portion 48 of the transport vehicle 32—preferably prior to pivoting the dump container 100 from the slag retaining configuration (best seen in FIG. 1) towards the slag pouring configuration (shown in FIG. 10).

The dump container 100 is constructed from high temperature metal materials—and the container support members 110 is constructed from high temperature plate metal materials so as to minimize the surface area at the plate edges which contacts the dump container 100—so as to impede heat transfer from the inside portion 112 to each of the frame pivot portion 122, the pallet support frame 74, and the transport vehicle 32.

According to the present invention, the apparatus 30 may simply include the pallet support frame 74 and the dump container 100, thus being adapted for use with a transport vehicle 32 of the general type described above.

Figure 12:
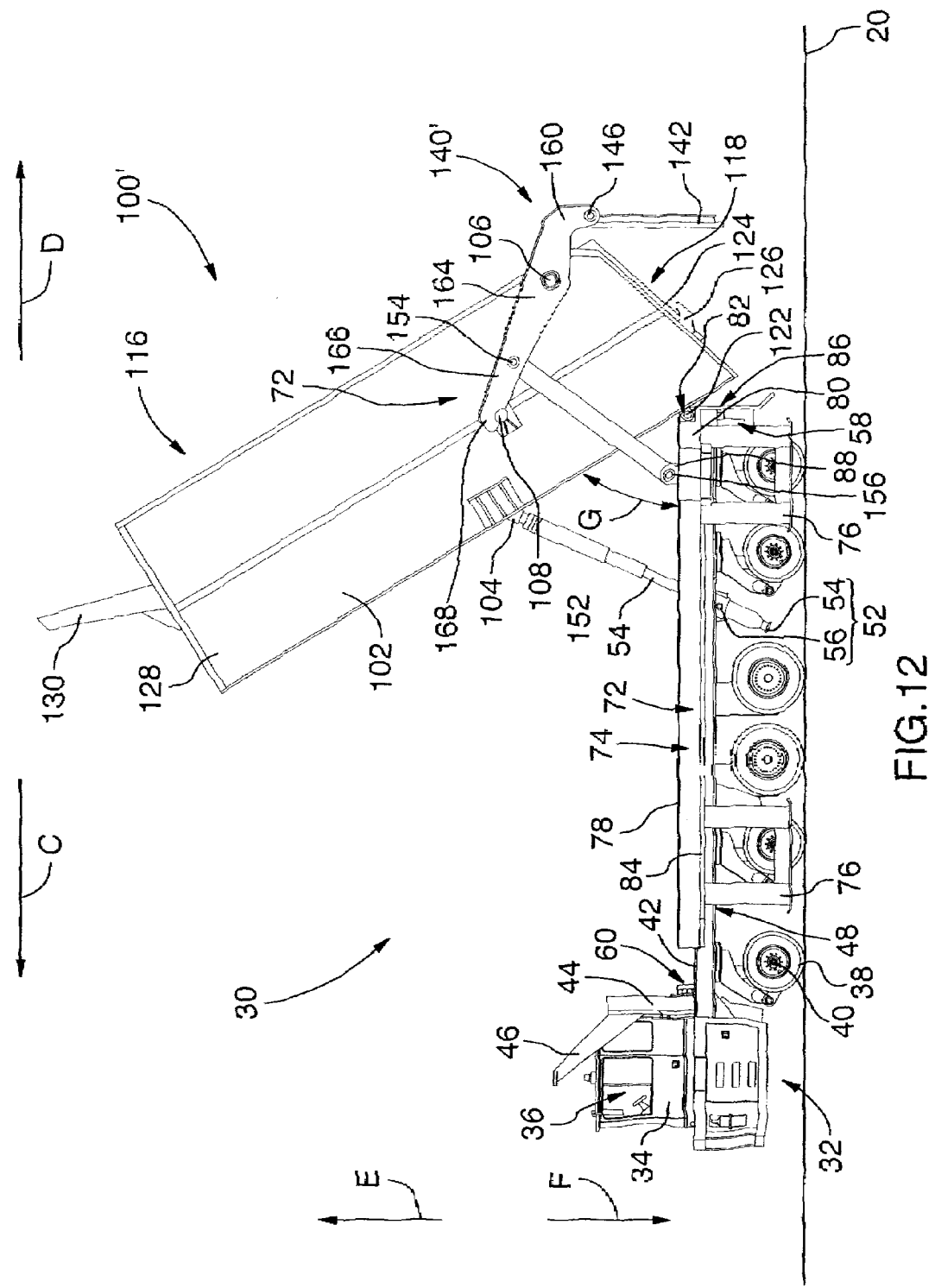
FIG. 12 of the drawings is a left side elevational view of an alternate embodiment of a transporter vehicle and pallet apparatus according to the invention, shown in a slag pouring configuration.

An alternate embodiment of the apparatus 30 (which is shown in the slag pouring configuration in FIG. 12) may include an alternate dump container 100' and an alternate tailgate mechanism 140', among other things. The rear door 142 of the alternate tailgate mechanism 140' slides within the guide rails 124 only to a point, whereupon it may swing rearward "D" from the dump opening 118. In most other respects, the components of the apparatus 30 shown in FIG. 12 may be generally analogous to those shown in FIGS. 1-11.

The present invention also includes a method of transporting and dumping the high temperature slag 22. The method includes a slag pouring step, a pallet support frame engaging step, a slag transporting step after the pallet support frame engaging step, a lifting mechanism engagement step, a slag dumping step after the lifting mechanism engagement step, and a door opening step that occurs substantially contemporaneously with the slag dumping step.

In the slag pouring step, the transport vehicle 32 is removed from the pallet support frame 74 and at least two ground support members 76 of the pallet support frame 74 rest securely upon the ground 20. The slag 22 is poured, from substantially adjacent to a steel making furnace (not shown), into the slag reservoir 116 of the dump container 100. The slag reservoir 116 receives and retains the slag 22 therein in the slag retaining configuration.

In the pallet support frame engaging step, the transport vehicle 32 is moved into the pallet released configuration whereat the rear transport bed 42 is beneath the pallet support frame 74. The rear transport bed 42 is raised from the pallet released configuration to the pallet secured configuration, such that the rear transport bed 42 securely engages the pallet support frame 74. In the pallet support frame engaging step, the guide members 86 provided on the pallet support frame 74 matingly engage the rear transport bed 42, so as to substantially align the lifting receptacles 104 of the dump container 100 with the telescopic dump cylinders 54 of the container lifting mechanism 52.

In the slag transporting step, the rear transport bed 42 is in the pallet secured configuration. The transport vehicle 32 is used to substantially carry the pallet support frame 74 and the dump container 100, and to transport the slag 22 in the slag reservoir 116 over the ground 20 to substantially adjacent to a slag dumping area (not shown).

In the lifting mechanism engagement step, the container lifting mechanism 52 is brought into engagement with the dump container 100. More particularly, the telescopic dump cylinders 54 of the container lifting mechanism 52 are brought into engagement with the lifting receptacles 104.

In the slag dumping step, the slag 22 is dumped substantially adjacent to the slag dumping area (not shown). The container lifting mechanism 52 pivots the dump container 100. more particularly, the telescopic dump cylinders 54 pivot the dump container 100, about its pivotable engagement with the pallet support frame 74, from the slag retaining configuration towards the slag pouring configuration, whereat the slag reservoir 116 permits release of the slag 22 therefrom.

In the door opening step, as the dump container pivots as aforesaid from the slag retaining configuration towards the slag pouring configuration, the rear door 142 of the tailgate mechanism 140 moves slidingly from the closed configuration towards the open configuration. More particularly, the aforesaid pivoting of the dump container 100 towards the slag pouring configuration causes pivoting of the link arms 152,152 about the link brackets 88,88. The aforesaid pivoting of the link arms 152,152 causes pivoting of the lift arms 158,158, relative to the link arms 152,152, about the lift arm pivot members 106,106. When the lift arms 158,158 pivot about the lift arm pivot members 106,106, the door pins 146,146 slidingly and pivotingly move within the lift arm track 162,162. In this manner, the rear door 142 is slid, between the door guide rails 124,124, from the closed configuration towards the open configuration.

The slag pouring step includes a pivot stopping step. In the pivot stopping step, the locking extensions 168,168 are brought into engagement with the locking members 108,108. This engagement restricts pivoting of the dump container 100 beyond the predetermined maximum value for the dumping angle "G".

From all of the above, it may be appreciated that the use of the apparatus 30 and method according to the present invention may obviate and/or mitigate one or more of disadvantages of the prior art. That is, the apparatus 30 and method according to the present invention may: (a) readily provide for the safe disposal of such slag and other high temperature by-products; (b) reduce the risk of death, injury, harm, or catastrophic incidents affecting persons and/or equipment; (c) reduce the required handling of slag and like materials; (d) reduce expenditures of time, effort and/or money in the industry; (e) provide for higher slag carrying capacities; (f) increases slag container stability and/or reduces the risk of tipping; (g) reduce the need for discrete slag container supporting structures and/or dedicated equipment for loading slag containers onto a transport vehicle; (h) reduce the risk of slag container explosion, slag spillage, and/or slag container breaches; (i) reduce the frequency of emergency facility shut-downs; (j) increase productivity; (k) reduce stresses arising whilst filling a slag container and/or retaining the slag therein; (l) reduce the weight of the slag container; (m) reduce the number of stages involved in slag processing and/or disposal; (n) reduce the amount of time that the slag must remain in the container; (o) enhance transport vehicle and/or slag container maneuverability; (p) provide for ready and/or controlled release of slag from the container; and/or (q) provide for ready disengagement of the transport vehicle from the pallet.

Various other modifications and alterations may be used in the design and manufacture of the apparatus 30 and method according to the present invention without departing from the spirit and scope of the invention, which is limited only by the accompanying claims. By way of a non-limiting example, either of the container and/or bed lifting mechanisms, and/or the locking cylinders, may be provided on the pallet 70 instead of on the vehicle 32. Of course, and as may be appreciated by persons having ordinary skill in the art, hydraulic cylinders and/or pneumatic cylinders may be used according to the invention, as may other lifting mechanisms (i.e., both apart from and including other cylinder mechanisms). It would also be within the scope of the invention to provide the container and frame pivot portions substantially adjacent to another end (e.g., a side end, a front end) of the pallet 70, and as such, the word "rear" may be alternately used herein to describe any peripheral portion of the pallet 70 from which the slag 22 may be dumped. Yet another exemplary modification might be to replace the transport vehicle shown in the drawings with another type of ground transport vehicle, e.g., a train.

The embodiments of the invention in which an exclusive property or privilege is claimed are defined as follows:

1. A slag transport and dumping apparatus for use in transporting high temperature slag over ground from a steel making furnace to a slag dumping area, said apparatus comprising:
   a) a transport vehicle that includes a front cab portion substantially enclosing an interior seating compartment, wheels adapted to rollably engage the ground, and a rear transport bed having a pallet interface portion;
   b) a pallet that includes:
      i) a pallet support frame having at least two ground support members adapted to rest securely upon the ground in a substantially upright slag loading configuration, and a pallet deck that includes a rear deck portion and a transporter interface portion, with said rear deck portion provided with a container pivot portion, and with said transporter interface portion selectively engaging said pallet interface portion of said transport vehicle in a substantially secure slag transporting configuration; and
      ii) a dump container securely supported upon said pallet support frame, said dump container having an outside portion, an inside portion that defines a slag reservoir, and a rear container portion that is provided with a frame pivot portion, with said frame pivot portion securely engaging said container pivot portion of said pallet support frame in selectively pivotable relation, such that said dump container is selectively pivotable about said container pivot portion between a slag retaining configuration whereat said slag reservoir is adapted to retain the slag therein, and a slag pouring configuration whereat said slag reservoir is adapted to permit release of the slag therefrom; and
   c) a container lifting mechanism securely mounted substantially adjacent to said rear transport bed of said transport vehicle, wherein said container lifting mechanism selectively engages said dump container, and selectively pivots said dump container from said slag retaining configuration towards said slag pouring configuration;
   wherein in said slag loading configuration, said slag reservoir is adapted to receive the slag, said dump container is in said slag retaining configuration, and said transport vehicle is removed from said pallet;
   wherein in said slag transporting configuration, said dump container is in said slag retaining configuration, and said transport vehicle securely engages said pallet, in substantially carrying relation, such as to enable selective transport of said pallet; and
   wherein said inside portion of said dump container is shaped to define a dump opening substantially adjacent to said rear container portion; with said pallet further comprising a tailgate mechanism that includes a rear door securely mounted on said dump container substantially adjacent to said rear container portion, with said rear door being slidably movable between: (A) a closed configuration whereat said dump container is in said slag retaining configuration, whereat said rear door substantially occludes said dump opening, and whereat said rear door is adapted to retain the slag in said slag reservoir; and (B) an open configuration whereat said dump opening is substantially unobstructed by said rear door, and said dump container is in said slag pouring configuration; and
   wherein movement of the dump container to the slag retaining configuration causes the rear door to move to the closed configuration; and movement of the dump container to the slag pouring configuration causes the rear door to move to the open configuration.

2. An apparatus according to claim 1, wherein said frame pivot portion and said container pivot portion together define a container pivot axis that is oriented in a substantially lateral direction.

3. An apparatus according to claim 1, wherein said dump container impedes heat transfer from said inside portion to each of said frame pivot portion, said pallet support frame, and said transport vehicle.

4. An apparatus according to claim 1, wherein said transport vehicle further comprises a bed lifting mechanism, securely mounted substantially adjacent to said rear transport bed, to selectively move said rear transport bed between: (a) a raised pallet secured configuration whereat said transporter interface portion of said pallet support frame securely engages said pallet interface portion of said transport vehicle; and (b) a lowered pallet released configuration whereat said transporter interface portion of said pallet support frame is removed from engagement with said pallet interface portion of said transport vehicle; wherein in said slag loading configuration, said rear transport bed of said transport vehicle is in said pallet released configuration; and wherein in said slag transporting configuration, said rear transport bed of said transport vehicle is in said raised pallet secured configuration.

5. An apparatus according to claim 1, wherein said container lifting mechanism comprises one or more telescopic dump cylinders securely and pivotably mounted to said rear transport bed of said transport vehicle, with said telescopic dump cylinders selectively engaging said dump container, and selectively pivoting said dump container from said slag retaining configuration towards said slag pouring configuration.

6. An apparatus according to claim 5, wherein in said slag loading configuration, said telescopic dump cylinders are removed from engagement with said dump container; and wherein said outside portion of said dump container is provided with one or more lifting receptacles that engage said telescopic dump cylinders during the aforesaid selective pivoting of said dump container from said slag retaining configuration towards said slag pouring configuration.

7. An apparatus according to claim 6, wherein said transporter interface portion and said pallet interface portion are together provided with mating guide members to substantially align said lifting receptacles of said dump container with said telescopic dump cylinders when said pallet is in said slag transporting configuration.

8. An apparatus according to claim 1, wherein said inside portion of said dump container inclines in a substantially upward direction towards said rear container portion.

9. An apparatus according to claim 1, wherein said dump container has a front container portion that is provided with a splash protection canopy which extends at least partially over said front cab portion of said transport vehicle when said pallet is in said slag transporting configuration.

10. An apparatus according to claim 1, wherein said pallet support frame comprises at least one link bracket, with each said link bracket being securely mounted substantially adjacent to said rear deck portion; wherein said outside portion of said dump container is provided with at least one lift arm pivot member; and wherein said tailgate mechanism further comprises at least one link arm and at least one lift arm, with each said link arm having a lift end portion, and a frame end portion pivotably mounted on one said link bracket, and with each said lift arm having a door end portion pivotably mounted to said rear door, a link end portion pivotably mounted on said lift end portion of one said link arm, and an intermediate container pivot portion pivotably mounted on one said lift arm pivot member of said dump container; wherein pivoting of said dump container, between said slag retaining configuration and said slag pouring configuration, pivots said link arm about said link bracket and said lift arm about said lift arm pivot member, so as to slide said rear door between said closed configuration and said open configuration.

11. An apparatus according to claim 10, wherein said rear container portion is provided with two opposing door guide rails, each substantially adjacent to said dump opening, with said rear door being slidably received between said door guide rails.

12. An apparatus according to claim 11, wherein said rear container portion is provided with one or more wedge lock members, each substantially adjacent to a bottom end portion of said dump opening, with said rear door being securely received within said wedge lock members in said closed configuration.

13. An apparatus according to claim 10, wherein said rear door comprises at least one door pin, and wherein said door end portion of said lift arm is shaped to define a lift arm track therein, with said lift arm track slid ably and pivotably mounted to said door pin, such that said door pin slides and pivots within said lift arm track when said lift arm pivots about said lift arm pivot member.

14. An apparatus according to claim 13, wherein said at least one link bracket comprises two link brackets, wherein said at least one lift arm pivot member comprises two lift arm pivot members, wherein said at least one link arm comprises two link arms, wherein said at least one lift arm comprises two lift arms, and wherein said at least one door pin comprises two door pins; with each opposing side portion of said pallet being provided with one of said link brackets, and cooperating ones of said lift arm pivot members, said link arms, said lift arms, and said door pins.

15. An apparatus according to claim 10, wherein a dumping angle is defined between said dump container and said pallet support frame; wherein said outside portion of said dump container is provided with at least one lift arm locking member; and wherein said link end portion of said lift arm is provided with a container locking extension that engages said lift arm locking member in said slag pouring configuration, so as to restrict pivoting of said dump container beyond a predetermined maximum value for said dumping angle.

16. An apparatus according to claim 15, wherein said predetermined maximum value for said dumping angle is substantially in the order of about 58 degrees.

17. An apparatus according to claim 1, wherein said rear door is provided with external seals to seal said rear door over said dump opening in said closed configuration.

18. An apparatus according to claim 1, wherein said rear door is adapted to substantially shear residual deposits of the slag from said rear container portion, substantially adjacent to said dump opening, when said rear door moves from said open configuration towards said closed configuration whilst said dump container pivots from said slag pouring configuration towards said slag retaining configuration.

19. An apparatus according to claim 4, wherein said bed lifting mechanism comprises one or more elevating cylinders securely mounted to said rear transport bed, with said elevating cylinders selectively raising and lowering said rear transport bed between said pallet secured configuration and said pallet released configuration.

20. An apparatus according to claim 1, further comprising one or more locking cylinders securely mounted substantially adjacent to said rear transport bed, with said locking cylinders selectively locking said transporter interface portion of said pallet support frame to said pallet interface portion of said transport vehicle prior to pivoting said dump container from said slag retaining configuration toward said slag pouring configuration.

21. A slag dumping pallet apparatus for use in dumping high temperature slag, said apparatus being for operative use with a transport vehicle that includes a front cab portion substantially enclosing an interior seating compartment, wheels adapted to rollably engage the ground, a rear transport bed having a pallet interface portion, and a container lifting mechanism securely mounted substantially adjacent to the rear transport bed; said apparatus comprising:

a) a pallet support frame having at least two ground support members adapted to rest securely upon the ground in a substantially upright slag loading configuration, and a pallet deck that includes a rear deck portion and a transporter interface portion, with said rear deck portion provided with a container pivot portion, and with said transporter interface portion adapted for selective operative engagement with said pallet interface portion of said transport vehicle in a substantially secure slag transporting configuration; and b) a dump container securely supported upon said pallet support frame, said dump container having an outside portion, an inside portion that defines a slag reservoir, and a rear container portion that is provided with a frame pivot portion, with said frame pivot portion securely engaging said container pivot portion of said pallet support frame in selectively pivotable relation, such that said dump container is selectively pivotable about said container pivot portion between a slag retaining configuration whereat said slag reservoir is adapted to retain the slag therein, and a slag pouring configuration whereat said slag reservoir is adapted to permit release of the slag therefrom;

wherein said dump container is adapted for operative and selective engagement with the container lifting mechanism to selectively pivot said dump container from said slag retaining configuration towards said slag pouring configuration;

wherein in said slag loading configuration, said slag reservoir is adapted to receive the slag, said dump container is in said slag retaining configuration, and said pallet is adapted to be operatively removed from said transport vehicle;

wherein in said slag transporting configuration, said dump container is in said slag retaining configuration, and said pallet is adapted to securely engage said transport vehicle, in substantially carrying relation, such as to enable selective operative transport of said pallet; and wherein said inside portion of said dump container is shaped to define a dump opening substantially adjacent to said rear container portion; with said pallet further comprising a tailgate mechanism that includes a rear door securely mounted on said dump container substantially adjacent to said rear container portion, with said rear door being slidably movable between: (A) a closed configuration whereat said dump container is in said slag retaining configuration, whereat said rear door substantially occludes said dump opening, and whereat said rear door is adapted to retain the slag in said slag reservoir; and (B) an open configuration whereat said dump opening is substantially unobstructed by said rear door, and said dump container is in said slag pouring configuration; and wherein movement of the dump container to the slag retaining configuration causes the rear door to move to the closed configuration; and movement of the dump container to the slag pouring configuration causes the rear door to move to the open configuration.

22. An apparatus according to claim 21, wherein said frame pivot portion and said container pivot portion together define a container pivot axis that is oriented in a substantially lateral direction.

23. An apparatus according to claim 21, wherein said dump container impedes heat transfer from said inside portion to each of said frame pivot portion and said pallet support frame.

24. An apparatus according to claim 21, wherein in said slag loading configuration, said dump container is operatively removed from the container lifting mechanism; and wherein said outside portion of said dump container is provided with one or more lifting receptacles that are adapted to operatively engage the container lifting mechanism during the aforesaid selective pivoting of said dump container from said slag retaining configuration towards said slag pouring configuration.

25. An apparatus according to claim 24, wherein said transporter interface portion is provided with guide members to matingly engage the pallet interface portion of the transport vehicle, and to substantially align said lifting receptacles of said dump container with the container lifting mechanism when said pallet is in said slag transporting configuration.

26. An apparatus according to claim 21, wherein said inside portion of said dump container inclines in a substantially upward direction towards said rear container portion.

27. An apparatus according to claim 21, wherein said dump container has a front container portion that is provided with a splash protection canopy which is adapted to operatively extend at least partially over the front cab portion of the transport vehicle when said pallet is in said slag transporting configuration.

28. An apparatus according to claim 21, wherein said pallet support frame comprises at least one link bracket, with each said link bracket being securely mounted substantially adjacent to said rear deck portion; wherein said outside portion of said dump container is provided with at least one lift arm pivot member; and wherein said tailgate mechanism further comprises at least one link arm and at least one lift arm, with each said link arm having a lift end portion, and a frame end portion pivotably mounted on one said link bracket, and with each said lift arm having a door end portion pivotably mounted to said rear door, a link end portion pivotably mounted on said lift end portion of one said link arm, and an intermediate container pivot portion pivotably mounted on one said lift arm pivot member of said dump container; wherein pivoting of said dump container, between said slag retaining configuration and said slag pouring configuration, pivots said link arm about said link bracket and said lift arm about said lift arm pivot member, so as to slide said rear door between said closed configuration and said open configuration.

29. An apparatus according to claim 28, wherein said rear container portion is provided with two opposing door guide rails, each substantially adjacent to said dump opening, with said rear door being slidably received between said door guide rails.

30. An apparatus according to claim 29, wherein said rear container portion is provided with one or more wedge lock members, each substantially adjacent to a bottom end portion of said dump opening, with said rear door being securely received within said wedge lock members in said closed configuration.

31. An apparatus according to claim 28, wherein said rear door comprises at least one door pin, and wherein said door end portion of said lift arm is shaped to define a lift arm track therein, with said lift arm track slid ably and pivotably mounted to said door pin, such that said door pin slides and pivots within said lift arm track when said lift arm pivots about said lift arm pivot member.

32. An apparatus according to claim 31, wherein said at least one link bracket comprises two link brackets, wherein said at least one lift arm pivot member comprises two lift arm pivot members, wherein said at least one link arm comprises two link arms, wherein said at least one lift arm comprises two lift arms, and wherein said at least one door pin comprises two door pins; with each opposing side portion of said pallet being provided with one of said link brackets, and cooperating ones of said lift arm pivot members, said link arms, said lift arms, and said door pins.

33. An apparatus according to claim 28, wherein a dumping angle is defined between said dump container and said pallet support frame; wherein said outside portion of said dump container is provided with at least one lift arm locking member; and wherein said link end portion of said lift arm is provided with a container locking extension that engages said lift arm locking member in said slag pouring configuration, so as to restrict pivoting of said dump container beyond a predetermined maximum value for said dumping angle.

34. An apparatus according to claim 33, wherein said predetermined maximum value for said dumping angle is substantially in the order of about 58 degrees.

35. An apparatus according claim 21, wherein said rear door is provided with external seals to seal said rear door over said dump opening in said closed configuration.

36. An apparatus according to claim 21, wherein said rear door is adapted to substantially shear residual deposits of the slag from said rear container portion, substantially adjacent to said dump opening, when said rear door moves from said open configuration towards said closed configuration whilst said dump container pivots from said slag pouring configuration towards said slag retaining configuration.

37. A method of transporting and dumping high temperature slag, said method comprising the steps of:
   a slag pouring step of pouring the slag, from substantially adjacent to a steel making furnace, into a slag reservoir defined by an inside portion of a dump container that is securely supported upon a pallet support frame, with said slag reservoir receiving and retaining the slag therein in a slag retaining configuration;
   a slag transporting step of using a transport vehicle having a rear transport bed that securely engages said pallet support frame to substantially carry said pallet support frame and said dump container, and to transport the slag in said slag reservoir over ground to substantially adjacent to a slag dumping area;
   a slag dumping step of dumping the slag substantially adjacent to the slag dumping area; wherein in said slag dumping step, a container lifting mechanism, securely mounted substantially adjacent to said rear transport bed of said transport vehicle, pivots said dump container, about a pivotable engagement between said dump container and said pallet support frame adjacent respective rear portions thereof, from said slag retaining configuration towards a slag pouring configuration whereat said slag reservoir permits release of the slag therefrom; and
   further comprising a door opening step, occurring substantially contemporaneously with said slag dumping step as said dump container pivots as aforesaid from said slag retaining configuration towards said slag pouring configuration, wherein in said door opening step, a rear door of a tailgate mechanism, which is securely mounted on said dump container substantially adjacent to a rear dump opening thereof, is slidingly moved from: (A) a closed configuration whereat said dump container is in said slag retaining configuration, whereat said rear door substantially occludes said dump opening, and whereat said rear door is adapted to retain the slag in said slag reservoir; towards (B) an open configuration whereat said dump opening is substantially unobstructed by said rear door, and said dump container is in said slag pouring configuration; and
   wherein movement of the dump container to the slag retaining configuration causes the rear door to move to the closed configuration; and movement of the dump container to the slag pouring configuration causes the rear door to move to the open configuration.

38. A method according to claim 37, wherein in said slag pouring step, said transport vehicle is removed from said pallet support frame and at least two ground support members of said pallet support frame rest securely upon the ground.

39. A method according to claim 37, further comprising a pallet support frame engaging step, before said slag transporting step, of moving said transport vehicle into a pallet released configuration whereat said rear transport bed is positioned beneath said pallet support frame; wherein in said pallet released configuration, said rear transport bed is removed from engagement with said pallet support frame; wherein in said pallet support frame engaging step, said rear transport bed is raised from said pallet released configuration to a pallet secured configuration, whereat said rear transport bed securely engages said pallet support frame; and wherein said rear transport bed is in said pallet secured configuration during said slag transporting step.

40. A method according to claim 39, further comprising a lifting mechanism engagement step, before said slag dumping step, of bringing said container lifting mechanism into engagement with said dump container.

41. A method according to claim 40, wherein in said lifting mechanism engagement step, one or more telescopic dump cylinders of said container lifting mechanism are brought into engagement with corresponding lifting receptacles provided on an outside portion of said dump container, such that in said slag dumping step, said telescopic dump cylinders pivot said dump container from said slag retaining configuration towards said slag pouring configuration as aforesaid.

42. A method according to claim 41, wherein in said pallet support frame engaging step, guide members provided on said pallet support frame matingly engage said rear transport bed, so as to substantially align said lifting receptacles of said dump container with said telescopic dump cylinders of said container lifting mechanism.

43. A method according to claim 37, wherein in said door opening step, the aforesaid pivoting of said dump container towards said slag pouring configuration causes pivoting of a link arm about a link bracket that is mounted to said pallet support frame, with the aforesaid pivoting of said link arm causing pivoting of a lift arm, relative to said link arm, about a lift arm pivot member that is mounted to an outside portion of said dump container and pivotably mounted to an intermediate container pivot portion of said lift arm, so as to slide said rear door from said closed configuration towards said open configuration.

44. A method according to claim 37, wherein in said door opening step, said rear door slidingly moves between door guide rails provided substantially adjacent to said dump opening.

45. A method according to claim 43, wherein in said door opening step, when said lift arm pivots about said lift arm pivot member, a door pin provided on said rear door slidingly and pivotingly moves within a lift arm track defined by a door end portion of said lift arm.

46. A method according to claim 43, wherein said slag pouring step comprises a pivot stopping step of engaging a locking extension provided on a link end portion of said lift arm with a locking member provided on said dump container, so as to restrict pivoting of said dump container beyond a predetermined maximum value for a dumping angle which is defined between said dump container and said pallet support frame.

47. A method according to claim 46, wherein in said pivot stopping step, said predetermined maximum value for said dumping angle is substantially in the order of about 58 degrees.

* * * * *